(12) United States Patent
Axelsson

(10) Patent No.: US 7,023,377 B2
(45) Date of Patent: Apr. 4, 2006

(54) NOISE MODULATED REMOTE DISTANCE MEASUREMENT

(75) Inventor: Sune Axelsson, Linköping (SE)

(73) Assignee: Saab AB, (SE)

( * ) Notice: Subject to any disclaimer, the term of this patent is extended or adjusted under 35 U.S.C. 154(b) by 144 days.

(21) Appl. No.: 10/473,816

(22) PCT Filed: Mar. 22, 2002

(86) PCT No.: PCT/SE02/00579

§ 371 (c)(1),
(2), (4) Date: May 10, 2004

(87) PCT Pub. No.: WO02/086538

PCT Pub. Date: Oct. 31, 2002

(65) Prior Publication Data

US 2004/0178948 A1 Sep. 16, 2004

(30) Foreign Application Priority Data

Apr. 2, 2001 (SE) .................................... 0101174

(51) Int. Cl.
*G01S 13/42* (2006.01)

(52) U.S. Cl. ................. 342/109; 342/111; 342/112; 342/115; 342/130; 342/135; 342/145; 342/194; 342/196

(58) Field of Classification Search ................ 342/109, 342/111, 112, 115, 116, 118, 127–136, 145, 342/189, 192, 194–196, 62, 67, 70

See application file for complete search history.

(56) References Cited

U.S. PATENT DOCUMENTS 5,075,863 A * 12/1991 Nagamune et al. ......... 702/159

(Continued)

OTHER PUBLICATIONS

"A pre-crash radar sensor system based on pseudo-noise coding", Filimon, V.; Buechler, J.; Microwave Symposium Digest., 2000 IEEE MTT-S Int'l vol. 3, Jun. 11-16, 2000 Ps: 1415-1418.*

(Continued)

*Primary Examiner*—John B. Sotomayor
(74) *Attorney, Agent, or Firm*—Swidler Berlin LLP

(57) ABSTRACT

The invention relates to remote distance measurement by means of a transmitted noise modulated probing signal (E), whereby at least one of a distance (Y(t)) and a velocity (V(t)) in relation to a signal transceiver (200) is determined. The probing of signal (E) is generated on basis of at least one first noise signal ($x_1(t)$, $x_2(t)$). The transmitted signal (E) is presumed to be reflected to the signal transceiver (200) via at least one signal reflecting object in the form of an information carrying signal (e). This signal thus constitutes a delayed and possibly doppler shifted version of the transmitted signal (E). Moreover, according to the invention, a second noise signal ($x_2(t)$) is added either to the probing signal (E) before it is transmitted or to the information carrying signal (e) before information pertaining to the reflecting object is derived there from. A primary signal ($P_1(x_1)$) is generated, which is based on the first noise signal ($x_1(t)$) and a secondary signal ($P_2(x_1, x_2)$) is generated, which is based on the information carrying signal (e). Thanks to the contribution from the second noise signal ($x_2(t)$) the subsequent signal processing of the primary signal ($P_1(x_1)$ and the secondary signal ($P_2(x_1, x_2)$) can be performed with a high linearity at the same time as a comparatively simple equipment can be can be utilized for digitizing (240) signal components ($S_I$, $S_Q$; $R_I$, $R_Q$), which have been demodulated from the primary signal ($P_1(x_1)$) and the secondary signal ($P_2(x_1, x_2)$) respectively. The solution according to the invention is also applicable at remote distance measurement by means of a digital group antenna system.

37 Claims, 13 Drawing Sheets

U.S. PATENT DOCUMENTS

| | | | |
|---|---|---|---|
| RE35,607 E * | 9/1997 | Nagamune et al. | 702/158 |
| 6,225,943 B1 * | 5/2001 | Curley et al. | 342/137 |
| 6,930,631 B1 * | 8/2005 | Puglia | 342/70 |
| 2003/0100285 A1 * | 5/2003 | Puglia | 455/293 |
| 2003/0103004 A1 * | 6/2003 | Arndt et al. | 342/465 |

OTHER PUBLICATIONS

"Range, radial velocity, and acceleration MLE using radar LFM pulse train", Abatzoglou, T.J.; Gheen, G.O.; Aerospace and Electronic Systems, IEEE Trans on vol. 34, Issue 4, Oct. 1998 Ps: 1070-1083.*

L. Guosui et al., Development of Random Signal Radars, IEEE Transactions on Aerospace and Electronic Systems, vol. 35, No. 3, Jul. 1999, pp. 770-777.

* cited by examiner

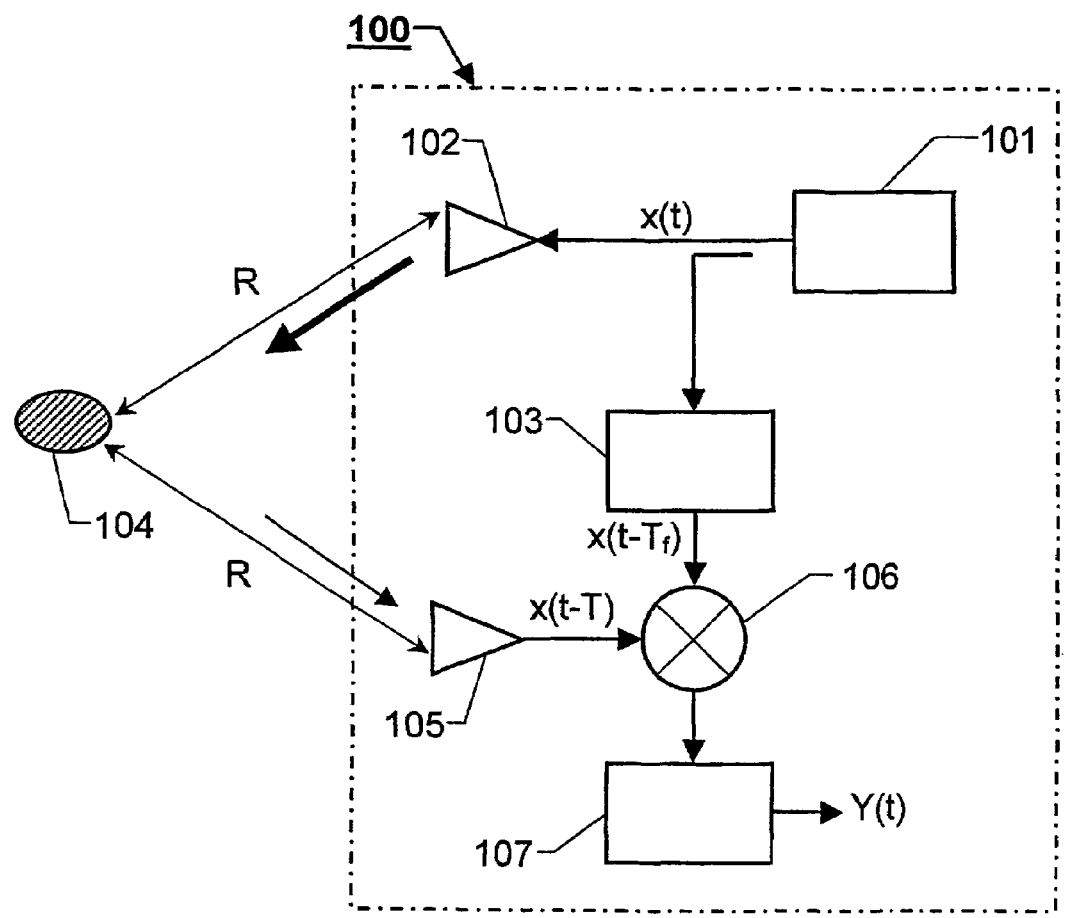
Fig. 1
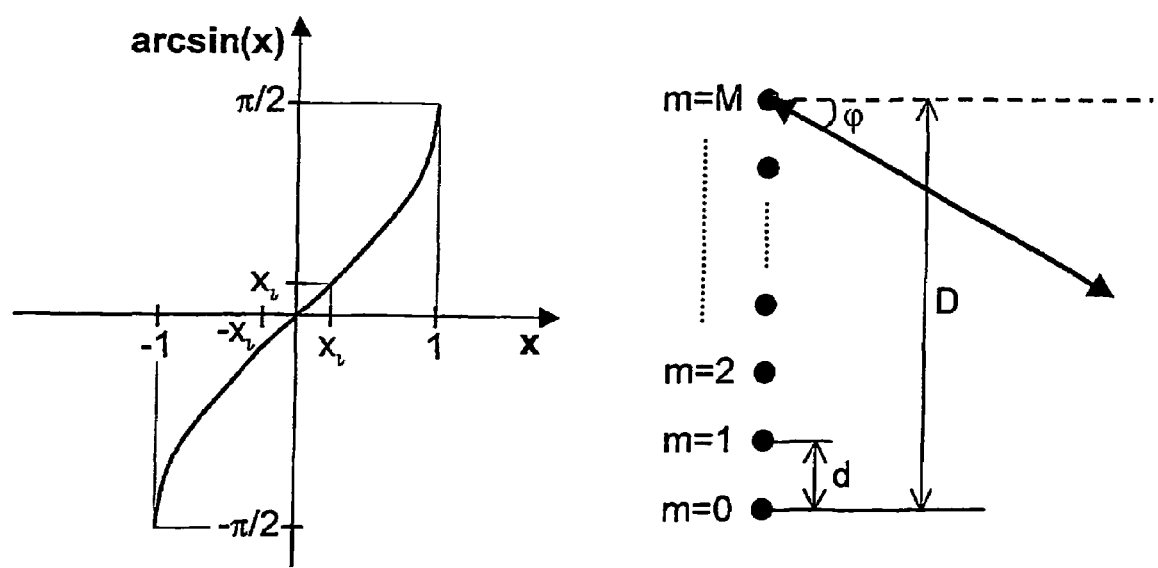
Fig. 3
Fig. 14

NOISE MODULATED REMOTE DISTANCE MEASUREMENT

THE BACKGROUND OF THE INVENTION AND PRIOR ART

The present invention relates generally to remote distance measurement by means of a received signal in a noise modulated signal transceiver. Specifically, the invention relates to remote distance measurement of signal reflecting objects in relation to a signal transceiver by means of the method and signal transceiver according to the preambles of claims 1 and 19 respectively. The invention also relates to a digital group antenna system.

Technical solutions where noise modulated radar transceivers are employed to determine distances have been known for a long time. Compared with other modulating principles the advantage of noise modulation is that a high distance resolution may thereby be obtained. Moreover, it is possible to transmit a radar signal at a high average power level, which in turn further enhances the radar's performance. A common application is binary phase modulation with a limited code length. However, there are also other types of noise modulation, for example in respect of the amplitude of a carrier wave. Noise modulated radar transceivers are likewise well suited for military applications, since it is comparatively difficult to reveal the noise signal. Provided that a high power level is utilized and a high resolution doppler filtering is employed, noise modulated radar devices show a very good immunity to noise disturbances.

Conventional pulse radar technology normally causes a problem with respect to ambiguity in distance. The problem is a consequence of that it must be possible to relate each radar echo to a particular transmitted pulse, such that a delay relative this pulse can be established. The delay in turn determines the distance to the object which produced the radar echo. A common method to mitigate the effects of the ambiguity problem is to use a variable pulse repetition frequency (PRF), so-called staggered PRF, whereby the time interval between two consecutively transmitted radar pulses varies from pulse to pulse. The ambiguity in distance is then resolved by registering multiple reflected pulses from one and the same reflecting object.

Noise modulated radar technology, however, requires no such methods, instead a reliable distance measurement may be accomplished on basis of a single radar pulse. Namely theoretically, the non-repetitive properties of the noise renders the radar's unambiguity interval infinitely long. Practically of course, the range is limited by other factors, such as the transmitter's output power level, the receiver's sensitivity and a longest acceptable delay.

FIG. 1 shows a block diagram over a per se known noise modulated radar transceiver 100. The following description of remote distance measurement with reference to FIG. 1 will pertain to a radar application, where a transmitted probing pulse is constituted by a radar signal, which propagates at the speed of light in the transmission medium in question. The remote distance measurement principle is, however, applicable also to other types of probing signals, such as sound waves. Naturally, these waves have a propagation speed which is considerably lower than for corresponding radar waves in all transmission media. Nevertheless, otherwise the conditions are in principle the same as in the radar case. Sound waves are advantageous as probing signals within many areas where radar signals are less suitable, for example in military- and civil sonar-/sodar- applications (for fish sweeping, mine sweeping and submarine sweeping) and in medical applications.

A noise generator 101 generates a noise signal x(t), which on one hand is fed to a delay element 103 in the form of a leak signal, and on the other hand is transmitted via a transmitter antenna 102 towards an object 104. The object 104 reflects a part of the radar signal x(t) against the radar transceiver 100, where a reflected radar signal x(t−T) is received via a receiver antenna 105. The reflected radar signal x(t−T) thus constitutes a delayed version of the transmitted radar signal x(t), where the delay is proportional to the distance R between the radar transceiver 100 and the object 104. A mixer 106 brings together the reflected radar signal x(t−T) and a reference signal x(t−$T_f$), which has passed through the delay element 103. The mixer 106 delivers a resulting signal to a lowpass filter 107. Given that the lowpass filter 107 has an impulse response h(t) the output signal Y(t) from the filter 107 may be described by the integral:

$$Y(t) = \int x(t-\tau-T)x(t-\tau-T_d)h(\tau)d\tau$$

where $T_f$ denotes the delay of the transmitted radar signal x(t), which the delay element 103 generates. The reflected radar signal's x(t−T) delay T in relation to the transmitted radar signal x(t) is T=2R/c, where R=the distance between the radar transceiver 100 and the object 104 and c=the radar signal's propagation speed, which is equal to the speed of light in the transmission medium in question (for example vacuum, air, water or soil layer).

When the delay T of the reflected radar signal x(t−T) corresponds to the delay $T_f$ of the delay element 103 the mixer 106 generates a powerful correlation peak, which may be used for determining the distance R to the object 104. Provided that a so-called distance slot is established at a distance $R_0 = cT_f/2$ and the object moves through this distance slot $R_0$ (due to the fact that at least one of the object 104 and the transceiver 100 moves) the output signal from the mixer 106 describes a high resolution, and in relation to the radar transceiver 100 a radial, reproduction of the object 104. The distance resolution ΔR for this reproduction is given by the relationship ΔR=c/(2B), where B=the bandwidth of the noise utilized. Thus, the larger the bandwidth B, the better the distance resolution ΔR becomes.

Given that the noise has an autocorrelation function $R_X(T-T_f)$ and that the lowpass filter 107 has a cut-off frequency, which lies considerably below the bandwidth of the noise B the output signal Y(t) has an average value <Y(t)>=$R_X(T-T_f)$. The filtering in the lowpass filter 107 can thereby be regarded as a form of an integration/averaging. When the product between the band-width of the noise B and the integration time $T_{int}$, i.e. the time during which data to the output signal Y(t) is collected, attains high values the output signal Y(t) approaches its average value <Y(t)>. Hence, the following approximation can be made:

$$Y(t) \approx \int R_X(T-T_f)d\tau = T_{int}R_X(T-T_f)$$

From this expression it is then possible to determine the delay T of the reflected radar signal x(t−T) by performing a search by means of the delay element's 103 delay $T_f$ after the maximum value of the output signal Y(t). When this value of the delay element's delay $T_f$ has been determined, the distance R to the object 104 may also be calculated according to R=cT/2.

However, the search for the maximum value of the output signal Y(t) involves an operation that is relatively intense in terms of calculation complexity, which either causes a comparatively long delay or demands a very powerful hardware. The solution becomes particularly processing intensive if also the relative velocity of the object 104 should be determined with a high accuracy.

SUMMARY OF THE INVENTION

The object of the present invention is to mitigate the above problems and present an efficient remote distance measurement solution for determining at least one of a distance and a relative velocity with respect to at least one reflecting object.

According to one aspect of the invention, this object is achieved by the initially described method for remote distance measurement of signal reflecting objects, which is characterized by adding a second noise signal, being uncorrelated with the first noise signal, to one of a transmitted probing signal and a received information carrying signal. The secondary signal will thereby include a signal component based on the first noise signal as well as a signal component based on the second noise signal. This in turn, results in that the signal processing of the primary signal and the secondary signal can be performed in manner being signal-wise advantageous, such that a high linearity can be obtained also by means of a very simple digitizing of the processed signals.

According to another aspect of the invention, this object is achieved by the initially described signal transceiver, which is characterized in that it includes an adding means for adding a second noise signal, being uncorrelated with the first noise signal, to one of a transmitted probing signal and a received information carrying signal. Through the adding means it is ensured that the secondary signal includes a signal component based on the first noise component as well as a signal component based on the second noise component. The following signal processing can thereby be performed with a high linearity at the same time as a simple equipment can be utilized for digitizing the processed signals.

According to yet another aspect of the invention, this object is achieved by the initially described digital group antenna system, which is characterized in that the antenna aperture includes at least two antenna units which are connected to a respective proposed signal transceiver. Preferably, the antenna units are distributed evenly over the antenna aperture. The group antenna system also includes a lobe processor for receiving a distance signal and a velocity signal respectively from each of the signal transceivers. Based on these signals, the lobe processor generates combined pieces of velocity information and distance information plus angular information related to signal reflecting objects within the range of the system.

The invention results in that an efficient remote distance measurement can be accomplished with high precision in radar applications as well as in applications where acoustic probing signals are utilized, without requiring any extreme components for digitizing the received signals. On the contrary, very simple and robust A/D-converters can be used. Naturally, this is desirable, since the manufacturing cost for the remote distance equipment may thereby be maintained or be reduced at the same time as its performance and reliability are improved.

The hitherto known solutions for remote distance measurement by means of a noise modulated probing signal however require A/D-converters with 8–12 bits resolution, which are relatively expensive and complex because they must fulfill high demands in terms of speed and precision.

BRIEF DESCRIPTION OF THE DRAWINGS

The present invention is now to be explained more closely by means of preferred embodiments, which are disclosed as examples, and with reference to the attached drawings.

FIG. 1 shows a block diagram over a per se known noise modulated signal transceiver, FIG. 3 illustrates graphically the cyclometric arcsine-function, which is included as a component in a mathematical model used according to the invention, FIG. 14 illustrates the principle for an antenna aperture in a digital group antenna system according to an embodiment of the invention.

DESCRIPTION OF PREFERRED EMBODIMENTS OF THE INVENTION

It is desirable that the signal transmitted from a noise modulated signal transceiver has a relatively high bandwidth, since this on one hand results in a comparatively low risk of the signal transceiver being revealed, and on the other hand provides a good distance resolution. The distance resolution $\Delta R$ namely depends on the bandwidth of the noise signal according to the relationship $\Delta R=c/(2B)$, where c represents the transmission speed of the probing signal in the transmission medium in question, which thus either substantially equals the speed of light or the propagation speed of sound waves depending on the type of probing signal. It is further advantageous if the transmitted probing signal has a high average power level and that the measurement is extended in time, since this enables a high resolution doppler filtering and results in a good immunity to noise disturbances. The distance resolution ΔR is alternatively also denoted distance slot in the literature.

If the noise modulated signal transceiver has a low frequency range, i.e. if the spectrum of the noise signal includes the frequencies 0 Hz to B Hz, where B denotes the bandwidth, a conventional doppler frequency analysis cannot be performed. Namely, there is no pronounced carrier wave. Instead a correlation method is applied in respect of a received signal, which has been reflected against a moving target at a distance R and with a radial velocity v. Due to the relative radial target movement the received signal will either be compressed or expanded in time as $x[\alpha(t-T_0)]$, where $\alpha=(1-2v/c)$ and $T_0$ is the delay of the received information carrying signal in relation to the transmitted signal according to the relationship $T_0=2R/c$, where c is the probing signal's respective the information carrying signal's propagation speed and R is the distance to the moving target. During the following signal processing a received signal $x[\alpha(t-T_0)]$ is correlated with a reference signal $x[\alpha_r(t-T_r)]$, where $\alpha_r=(1-2v_r/c)$. The delay $T_r=2R_r/c$ and $\alpha_r$ are varied in order to determine the position of the correlation maximum value, which is defined as $\alpha_{r0}$ and $T_{r0}$. The target's radial velocity v and distance R can then be estimated from $v=c(1-\alpha_{r0})/2$ and $R=cT_{r0}/2$ respectively.

Even if the noise signal is modulated around a carrier wave at a particular frequency, in principle, the same method can be applied as for the low frequency range noise modulated signal transceiver for detecting distance and velocity. Normally however, a frequency translation is performed in respect of the received signal before performing the correlation calculation.

Figure 2:
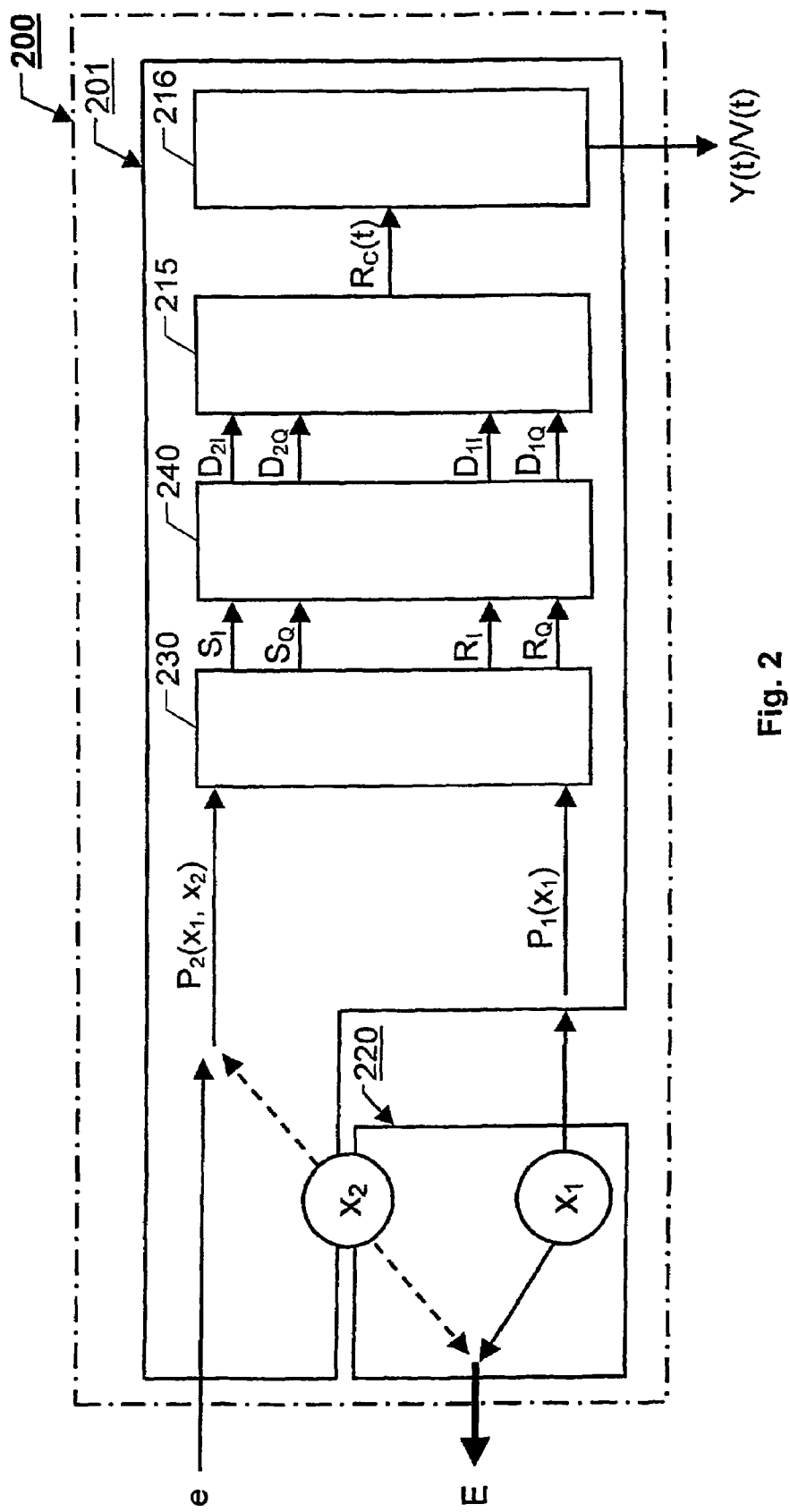
FIG. 2 shows a general block diagram over a noise modulated signal transceiver according to the invention.

FIG. 2 shows a general block diagram over a noise modulated signal transceiver 200 according to the invention. The signal transceiver 200 includes a transmitter 220 and a receiver 201. The transmitter 220 includes a means for generating a first noise signal $x_1$, which according to a preferred embodiment of the invention is composed of non-periodic Gaussian noise. Preferably, the first noise signal $x_1$ may, however, also be composed of so-called pseudo noise or a sine wave signal, which is phase/frequency modulated with noise or a phase code.

A probing signal E transmitted from the transmitter 220 is based on at least the first noise signal $x_1$. The transmitted probing signal E is accomplished, for example by modulation of a periodic signal in respect of the first noise signal $x_1$, which is subsequently filtered and amplified in one or multiple stages. Furthermore, a signal component which is based on a second noise component $x_2$, being uncorrelated with the first noise component $x_1$, is included in the transmitted probing signal E. The influence of the second noise signal $x_2$ will be discussed below with reference to FIG. 3.

A transmitted probing signal E exclusively based on the first noise signal $x_1$ can be expressed as $x_1(t)\exp(j2\pi f_0 t)$ while a transmitted probing signal E based on the first noise signal $x_1$ as well as the second noise signal $x_2$ can be described by means of the expression $(x_1(t)+x_2(t))\exp(j2\pi f_0 t)$.

The transmitted probing signal E is presumed to be reflected by at least one signal reflecting object and be partly reflected to the signal transceiver 200 in the form of an information carrying signal e, which is received by the receiver 201. If at least one reflecting object moves relative the signal transceiver 200 the information carrying signal e also shows a doppler shift in relation to the transmitted probing signal E. Provided that no signal component based on the second noise signal $x_2$ is included in the transmitted signal E, such a signal component is added to the received information carrying signal e in the receiver 201 before information pertaining to the reflected objects is derived from the information carrying signal e. Otherwise, the information carrying signal e is fed further to a subsequent signal processing without addition of any further noise.

In any case, the receiver 201 generates a primary signal $P_1(x_1)$ on basis of the first noise component $x_1$ and a secondary signal $P_2(x_1, x_2)$ on basis of the information carrying signal e. The secondary signal $P_2(x_1, x_2)$ thus includes signal components which both originate from the first noise signal $x_1$ and from the second noise signal $x_2$.

A demodulator 230 receives the primary signal $P_1(x_1)$ and generates on basis thereof at least one primary demodulated signal component $R_I$, $R_Q$. Correspondingly, the demodulator 230 receives the secondary signal $P_2(x_1, x_2)$ and generates in response thereto a secondary demodulated signal component $S_I$, $S_Q$. According to a preferred embodiment of the invention, the demodulator 230 includes a first quadrature demodulator, which produces two primary demodulated signal components in the form of quadrature signals $R_I$ and $R_Q$ respectively and a second quadrature demodulator, which produces two secondary demodulated signal components in the form of quadrature signals $S_I$ and $S_Q$ respectively.

A digitizing unit 240 receives the at least one primary demodulated signal component $R_I$, $R_Q$ and the at least one secondary demodulated signal component $S_I$, $S_Q$ and based thereon forms at least one digital primary signal component $D_{1I}$, $D_{1Q}$ respective at least one secondary digital signal component $D_{2I}$, $D_{2Q}$. According to a preferred embodiment of the invention, the digitizing unit 240 includes a sign detecting converter (i.e. a binary A/D-converter) for converting a respective demodulated signal component, thus in total four A/D-converters.

After sign detection (binary A/D-conversion) the doppler correlation function for narrowband noise, exclusively based on one noise signal $x_1$ and one reflecting object can be written:

$$(I): \quad R_r(T, T_R) = 2T_{int}\left(\frac{2}{\pi}\right)\arcsin\{\rho(T-T_R)\cos[2\pi f_0(T-T_R)]\}$$

$$(Q): \quad R_i(T, T_R) = 2T_{int}\left(\frac{2}{\pi}\right)\arcsin\{\rho(T-T_R)\sin[2\pi f_0(T-T_R)]\}$$

where T=2R/c(i.e. the two-way delay to the reflecting object)

$T_R$=the delay of the reference signal $T_{int}$=the integration time

ρ=a normalized autocorrelation function of the first noise signal $x_1(t)$ $$\rho = \frac{R(\tau)}{R(0)}; \quad R(\tau) = \frac{1}{N}\sum_{n=1}^{N}x_1 N\Delta t,$$

where, N is the number of signal samples over which the auto correlation is calculated.

In practice, also the integration time $T_{int}$ means that a particular number of signal samples K are regarded during the calculation.

The factor $2\pi f_0 T$ involves a time variation, which contains the doppler frequency: $2\pi f_0 T=2\pi f_0 T_0+2\pi f_d t$ where: $f_0$=carrier wave frequency, typically 1–100 GHz
$f_d$=doppler shift; $f_d=f_0((c+v)/(c-v)-1)$ (generally), and $f_d=2f_0v/c$ (for v<<c)
c=propagation speed of the remote distance measurement signal in the relevant medium
v=relative radial velocity However, by adding the noise signal $x_2(t)$ to one of the transmitted probing signal and the information carrying signal it is ensured that the arcsine components in the equations (I) and (Q) above attain relatively small values for which the arcsine function is "close-to-linear".

FIG. 3 shows a graph over the arcsine function, which is defined for values $-1 \leq x \leq 1$. For small values $|x|<x_t$ the approximation $\arcsin(x) \approx x$ is true. The approximation is true with sufficient accuracy at least for $x_t \approx 0,3$.

A correlator 215 receives the at least one primary digital signal component $D_{1I}$, $D_{1Q}$ and at least one secondary digital signal component $D_{2I}$, $D_{2Q}$. The correlator 215 correlates the at least one primary digital signal component $D_{1I}$, $D_{1Q}$ with the and at least one secondary digital signal component $D_{2I}$, $D_{2Q}$ and forms a resulting correlation signal $R_C(t)$, where $R_C(t)$ is the complex correlation function, i.e. a complex representation of the signal components according to (I) and (Q) above, such that $R_C(T_R,t)=R_r(T,T_R)+jR_i(T,T_R)$.

In course of the correlation, $R_C(T_R,t)$ is calculated for a number $T_R$-values of which each represents a distance slot. The correlation calculation is then repeated for new noise pulses, i.e. for new values of a time parameter t. In respect of these, the doppler frequency $2\pi f_0 T$ has had time to be effective, such that the phase factor: $2\pi f_d T$ in the complex number $R_C$ in a given distance slot varies with the time parameter t. A doppler shift is subsequently determined by means of a fast Fourier transform (FFT) of a burst of time samples from $R_C(T_R,t)$ for the distance slot corresponding to a given $T_R$-value. Thereby, the radial velocities of target echoes in the distance slot in question can be calculated. The corresponding FFT-calculation is performed for all distance slots (i.e. also for the remaining $T_R$-values). Hence, the value of the variable $T_R$ in $R_C(T_R,t)$ defines a distance position of a distance slot. The time parameter t is, on the other hand, linked to doppler information, since a doppler spectrum for different $T_R$-values (distance slots) is obtained by FFT-calculation of time samples from $R_C(T_R,t)$.

The included components may be further approximated to:

$$(I): \quad R_r(T, T_R) \approx 2T_{int}\left(\frac{2}{\pi}\right)\rho(T-T_R)\cos(2\pi f_0(T-T_R))$$

$$(Q): \quad R_i(T, T_R) \approx 2T_{int}\left(\frac{2}{\pi}\right)\rho(T-T_R)\sin(2\pi f_0(T-T_R))$$

The correlation signal $R_C(T,T_R)$ is calculated by the correlator 215 according to the above for variable values of the delay $T_R$ of the reference signal, defining the distance slots $\Delta R$, and time samples of the correlation signals for the different $T_R$-values (the distance slots) are fed as input signals to a doppler processor 216. The doppler processor 216 performs, for each distance slot, a high resolution doppler filtering of the correlation signal $R_C(T_R,t)$, via for example a filter bank or FFT-processing, whereby distance information Y(t) as well as a radial velocity vector V(t) of the respective reflecting objects are determined. Distance- and velocity information pertaining to reflecting objects are preferably handled collectively via a so-called distance-/doppler-matrix Y(t)N(t). The distance- and doppler filtering can thereby also be performed in a combined unit for distance determination and velocity-determination instead of in separate units 215 and 216 respectively.

Doppler detection, of course, renders it possible to identify targets and other objects which move radially in relation to the remote distance measurement equipment. Furthermore, doppler detection can be used for suppressing noise when the equipment is mounted in a vessel, a craft or other mobile entity, such as a robot. Echoes with a doppler-component substantially equal to the vessel's own velocity can hereby be suppressed as probable noise echoes, from the ground or other surface.

The FIGS. 1–12 show different embodiments of signal transceivers for remote distance measurement according to the invention. The corresponding text below only explicitly refers to radar applications. However, the principles according to the respective embodiments are applicable also for other types of probing signals, such as sound waves. A sonar/sodar includes a vibrating element, which for example is electromechanically controlled by means of a piezoelectric transformer instead of a radar transmitter and an antenna. Either the same element is exploited both for transmitting and receiving the sound waves or separate elements may be employed. In both cases, the transmitter normally must be decoupled during reception, and vice versa, the receiver must be decoupled during transmission. The other parts of the signal transceiver may be the same independently of the type of probing signal employed. Naturally, the included components must be adapted to a relevant frequency range. A sonar/sodar normally operates within the frequency range 30–200 kHz while a radar generally utilizes signals within the frequency band 0,1–100 GHz.

Figure 4:
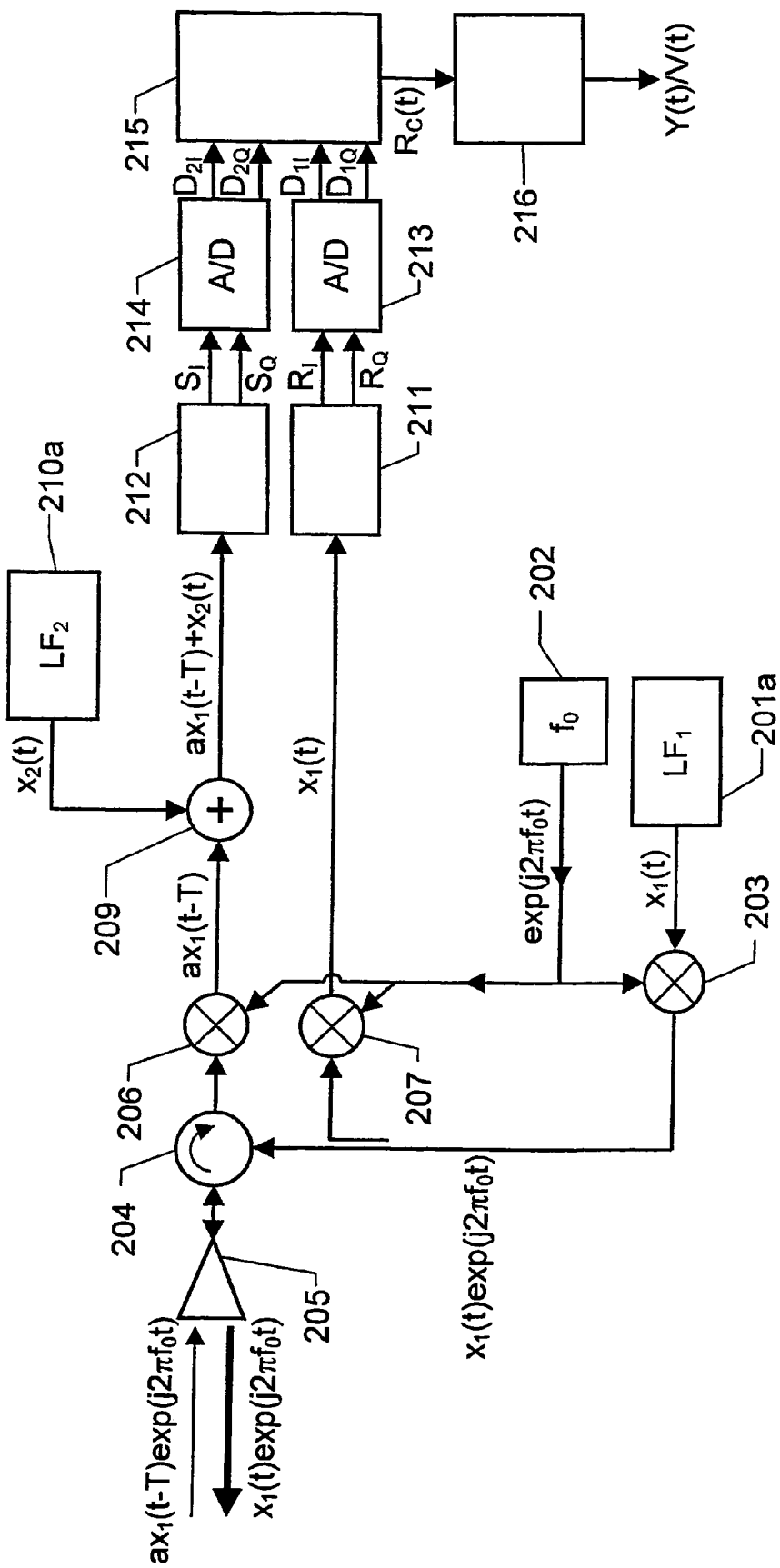
FIG. 4 shows a block diagram over a noise modulated signal transceiver according to a first embodiment of the invention.

FIG. 4 shows a block diagram over a noise modulated radar transceiver according to a first embodiment of the invention, where a transmitted radar signal $x_1(t)\exp(j2\pi f_0 t)$ includes a first noise component $x_1(t)$, which is modulated around a carrier wave $f_0$. A comparatively low frequency first noise generator 201a here generates the first noise signal $x_1(t)$. A modulator (mixer) 203 receives, on one hand the first noise signal $x_1(t)$ and, on the other hand a high frequency signal $f_0$ from a local oscillator 202. The modulator 203 delivers an up-converted noise signal $x_1(t)\exp(j2\pi f_0 t)$ on its output. The up-converted noise signal $x_1(t)\exp(j2\pi f_0 t)$ is fed further via a directional coupler 204 to an antenna system 205, via which a corresponding radar signal $x_1(t)\exp(j2\pi f_0 t)$ is transmitted. Preferably, the transmission chain as well as the reception chain include amplifiers and filters that are adapted to the bandwidth of the signals, which however not are shown in the figure.

The transmitted radar signal $x_1(t)\exp(j2\pi f_0 t)$ is presumed to be reflected by at least one object and be partly reflected to the radar transceiver in the form of an information carrying signal $ax_1(t-T)\exp(j2\pi f_0 t)$ (where $a=a_0\exp(-j2\pi f_0 T)$), which is received by the antenna system 205. Provided that the reflecting object is moving in relation to the radar transceiver, T varies and a doppler shift occurs. After having passed the directional coupler 204 the signal is fed to a first down-converter 206. This frequency down transforms the information carrying signal $ax_1(t-T)\exp(j2\pi f_0 t)$ to a down-converted signal $ax_1(t-T)$ by mixing it with the output signal $f_0$ from the local oscillator 202.

A second noise generator 210a generates a second noise signal $x_2(t)$, which is uncorrelated with the first noise signal $x_1(t)$. An adder 209 receives the second noise signal $x_2(t)$ and adds it to the down-converted signal $ax_1(t-T)$, whereby a summation signal $ax_1(t-T)+x_2(t)$ is formed (compare with $P_2(x_1, x_2)$ in FIG. 2).

A part of the transmitted radar signal $x_1(t)\exp(j2\pi f_0 t)$ is also returned as a leak signal to the receiver part of the transceiver. A second down-converter 207 receives this part of the transmitted radar signal $x_1(t)\exp(j2\pi f_0 t)$ and frequency transforms it down to a reference signal $x_1(t)$ (compare with $P_1(x_1)$ i FIG. 2).

A first quadrature modulator 211 receives the reference signal $x_1(t)$ and generates primary demodulated signal components $R_I$ and $R_Q$ respectively. Correspondingly, a second demodulator 212 receives the summation signal $ax_1(t-T)+x_2(t)$ and generates, based thereon, secondary demodulated signal components $S_I$ and $S_Q$ respectively. The primary demodulated signal components $R_I$ and $R_Q$ are fed to a first A/D-converter 213, which converts them into a set of primary digital signal components $D_{1I}, D_{1Q}$ and the secondary demodulated signal components $S_I$ and $S_Q$ are fed to a second A-/D-converter 214, which converts them into a set of secondary digital signal components $D_{2I}, D_{2Q}$.

The first and the second A/D-converters 213, 214 are preferably so-called few-bit A/D-converters, which means that they have comparatively few quantising levels (or a low resolution) at least with respect to the amplitude information in the primary signal $P_1(x_1)$ and the secondary signal $P_2(x_1, x_2)$ respectively. A few-bit A/D-converter according to the invention typically has 2–4 quantising levels and thus has a 1–2 bits resolution. According to a preferred embodiment of the invention, the A/D-converter only has one bit resolution, i.e. it is merely sign detecting.

A correlator 215 receives the primary digital signal components $D_{1I}, D_{1Q}$ and the secondary digital signal components $D_{2I}, D_{2Q}$, correlates them mutually with a variable delay $T_R$ and generates a correlation signal $R_C(T_R, t)$, where $R_C(T_R, t)$ is the complex correlation function. Every $T_R$-value thus corresponds to a distance slot. A subsequent doppler processor 216 processes time samples of the correlation signal $R_C(T_R, t)$ for all distance slots and produces a matrix whose complex figure elements represent reflected signal values from different distances and doppler frequencies. For example, by means of a threshold-procedure echoes of a certain minimum strength in respect of doppler and distance can be determined. From this information, in turn, distance information Y(t) and velocity information V(t) can be extracted for corresponding reflecting objects.

Figure 5:
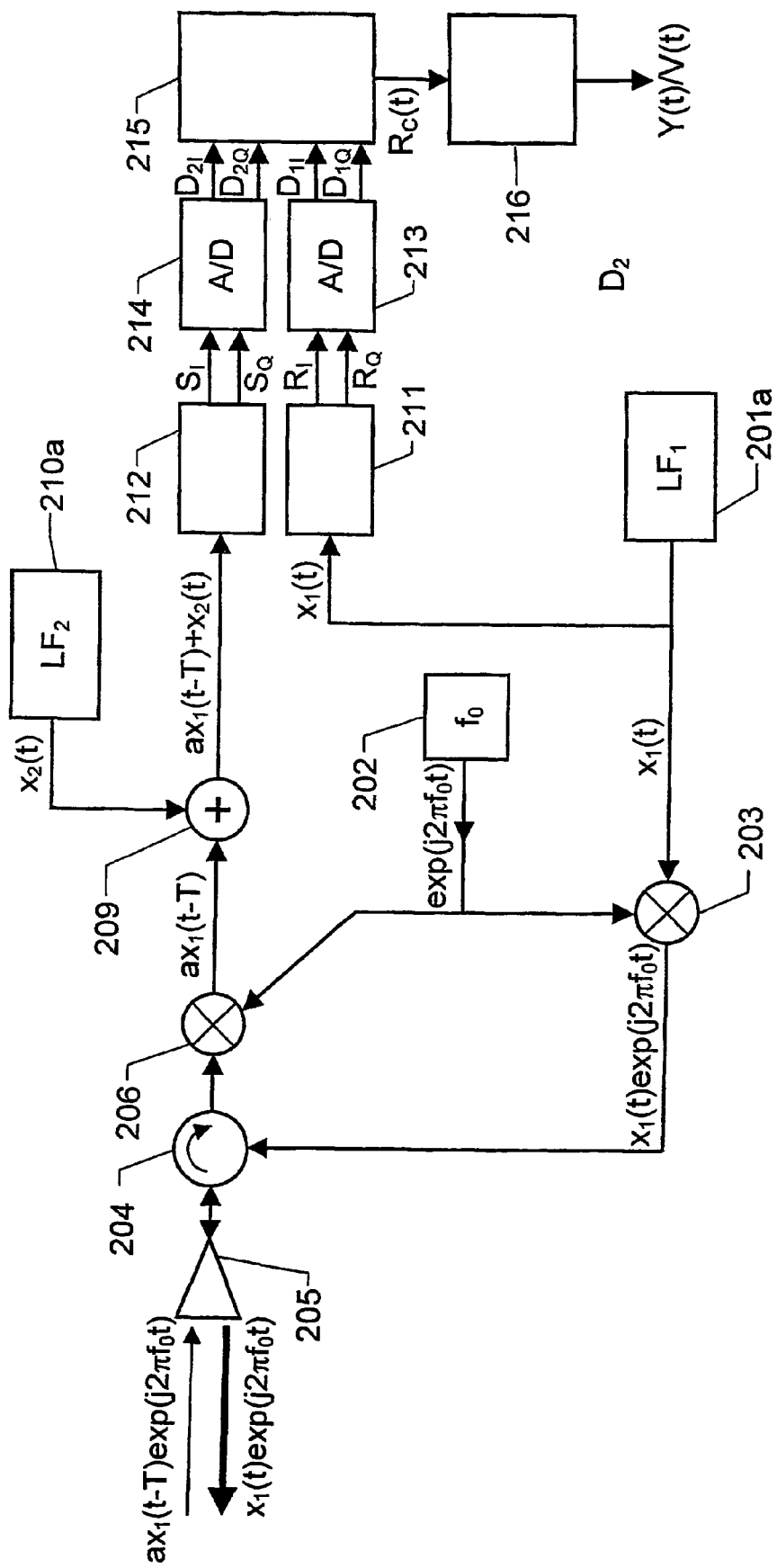
FIG. 5 shows a block diagram over a noise modulated signal transceiver according to a second embodiment of the invention.

FIG. 5 shows a block diagram over a noise modulated radar transceiver according to a second embodiment of the invention, where a transmitted radar signal $x_1(t)\exp(j2\pi f_0 t)$ includes a first noise component $x_1(t)$, which is modulated around a carrier wave $f_0$. A comparatively low frequency first noise generator 201a generates the first noise signal $x_1(t)$. A modulator 203 receives, on one hand the first noise signal $x_1(t)$ and, on the other hand a high frequency signal $f_0$ from a local oscillator 202. The modulator 203 delivers an up-converted noise signal $x_1(t)\exp(j2\pi f_0 t)$ on its output. The up-converted noise signal $x_1(t)\exp(j2\pi f_0 t)$ is fed further via a directional coupler 204 to an antenna system 205, via which a corresponding radar signal $x_1(t)\exp(j2\pi f_0 t)$ is transmitted. Preferably, the transmission chain as well as the reception chain include amplifiers and filters that are adapted to the bandwidth of the signals, which however not are shown in the figure.

The transmitted radar signal $x_1(t)\exp(j2\pi f_0 t)$ is presumed to be reflected by at least one object and be partly reflected to the radar transceiver in the form of an information carrying signal $ax_1(t-T)\exp(j2\pi f_0 t)$ (where $a=a_0\exp(-j2\pi f_0 T)$), which is received by the antenna system 205. Provided that the reflecting object is moving in relation to the radar transceiver, T varies and a doppler shift occurs. After having passed the directional coupler 204 the signal is fed to a first down-converter 206. This frequency down transforms the information carrying signal $ax_1(t-T)\exp(j2\pi f_0 t)$ to a down-converted signal $ax_1(t-T)$ by mixing it with the output signal $f_0$ from the local oscillator 202.

A second noise generator 210a generates a second noise signal $x_2(t)$, which is uncorrelated with the first noise signal $x_1(t)$. An adder 209 receives the second noise signal $x_2(t)$ and adds it to the down-converted signal $ax_1(t-T)$, whereby a summation signal $ax_1(t-T)+x_2(t)$ is formed (compare with $P_2(x_1, x_2)$ in FIG. 2). The first noise signal $x_1(t)$ is fed to the receiver part of the radar transceiver in the form of a reference signal $x_1(t)$ (compare with $P_1(x_1)$ in FIG. 2).

A first quadrature demodulator 211 receives the reference signal $x_1(t)$ and generates primary demodulated signal components $R_I$ and $R_Q$ respectively. Correspondingly, a second quadrature demodulator 212 receives the summation signal $ax_1(t-T)+x_2(t)$ and generates, based thereon, secondary demodulated signal components $S_I$ and $S_Q$ respectively. The primary demodulated signal components $R_I$ and $R_Q$ are fed to a first A/D-converter 213, which converts them to a set of primary digital signal components $D_{1I}, D_{1Q}$ and the secondary demodulated signal components $S_I$ and $S_Q$ are fed to a second A/D-converter 214, which converts them to a set of secondary digital signal components $D_{2I}, D_{2Q}$.

The first and the second A/D-converters 213, 214 are preferably so-called few-bit A/D-converters, which means that they have comparatively few quantising levels (or a low resolution) at least with respect to the amplitude information in the primary signal $P_1(x_1)$ and the secondary signal $P_2(x_1, x_2)$ respectively. A few-bit A/D-converter according to the invention typically has 2–4 quantising levels and thus has a 1–2 bits resolution. According to a preferred embodiment of the invention, the A/D-converter only has one bit resolution, i.e. it is merely sign detecting.

A correlator 215 receives the primary digital signal components $D_{1I}, D_{1Q}$ and the secondary digital signal components $D_{2I}, D_{2Q}$, correlates them mutually with a variable delay $T_R$ and generates a correlation signal $R_C(T_R, t)$, where $R_C(T_R, t)$ is the complex correlation function. Every $T_R$-value thus corresponds to a distance slot. A subsequent doppler processor 216 processes time samples of the correlation signal $R_C(T_R, t)$ for all distance slots and produces a matrix whose complex figure elements represent reflected signal values from different distances and doppler frequencies. For example, by means of a threshold-procedure echoes of a certain minimum strength in respect of doppler and distance can be determined. From this information, in turn, distance information Y(t) and velocity information V(t) can be extracted for corresponding reflecting objects.

Figure 6:
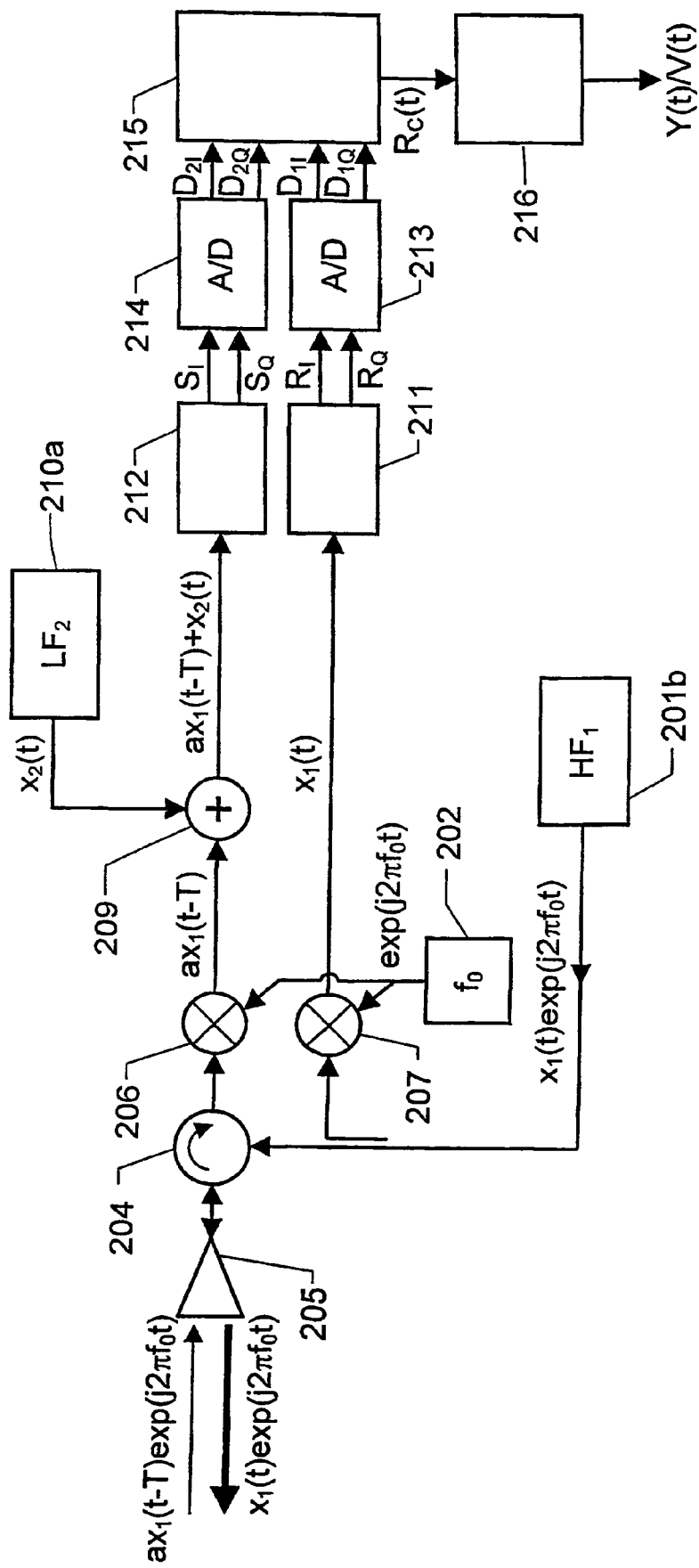
FIG. 6 shows a block diagram over a noise modulated signal transceiver according to a third embodiment of the invention.

FIG. 6 shows a block diagram over a noise modulated radar transceiver according to a third embodiment of the invention. Here, a first noise signal $x_1(t)\exp(j2\pi f_0 t)$ from a high frequency noise generator 201b constitutes a direct basis for the transmitted radar signal. The noise signal $x_1(t)\exp(j2\pi f_0 t)$ is a narrow band Gaussian noise process around a carrier wave at a frequency $f_0$. The signal $x_1(t)\exp(2\pi f_0 t)$ from the noise generator 201b is fed via a directional coupler 204 to an antenna system 205, via which a radar signal $x_1(t)\exp(j2\pi f_0 t)$ is transmitted. In similarity with the earlier described embodiment of the invention, it is presumed that the transmitted radar signal $x_1(t)\exp(j2\pi f_0 t)$ is reflected by at least one object and is partly reflected to the radar transceiver in the form of an information carrying signal $ax_1(t-T)\exp(j2\pi f_0 t)$, which is received by the antenna system 205. Preferably, the transmission chain as well as the reception chain include amplifiers and filters that are adapted to the bandwidth of the signals, which however not are shown in the figure.

The information carrying signal $ax_1(t-T)\exp(j2\pi f_0 t)$ is subsequently fed to a down converter 206. This frequency down transforms the information carrying signal $ax_1(t-T)\exp(j2\pi f_0 t)$ to a down converted signal $ax_1(t-T)$ by mixing it with the output signal $f_0$ from a local oscillator 202. A second noise generator 210a generates a comparatively low frequency second noise signal $x_2(t)$, which is uncorrelated with the first noise signal $x_1(t)\exp(j2\pi f_0 t)$.

An adder 209 receives the second noise signal $x_2(t)$ and adds it to the down converted signal $ax_1(t-T)$, whereby a summation signal $ax_1(t-T)+x_2(t)$ is formed (compare with $P_2(x_1, x_2)$ in FIG. 2). A fraction of the transmitted radar signal $x_1(t)\exp(j2\pi f_0 t)$ is also returned as a leak signal to the receiver part of the radar transceiver. A second down converter 207 receives this part of the transmitted radar signal $x_1(t)\exp(j2\pi f_0 t)$ and frequency transforms it down to a reference signal $x_1(t)$ (compare with $P_1(x_1)$ in FIG. 2).

A first quadrature demodulator 211 receives the reference signal $x_1(t)$ and generates primary demodulated signal components $R_I$ and $R_Q$ respectively. Correspondingly, a second quadrature demodulator 212 receives the summation signal $ax_1(t-T)+x_2(t)$ and generates, based thereon, secondary demodulated signal components $S_I$ and $S_Q$ respectively. The primary demodulated signal components $R_I$ and $R_Q$ are fed to a first A/D-converter 213, which converts them to a set of primary digital signal components $D_{1I}, D_{1Q}$ and the secondary demodulated signal components $S_I$ and $S_Q$ are fed to a second A/D-converter 214, which converts them to a set of secondary digital signal components $D_{2I}, D_{2Q}$.

A correlator 215 receives the primary digital signal components $D_{1I}, D_{1Q}$ and the secondary digital signal components $D_{2I}, D_{2Q}$, correlates them mutually with a variable delay $T_R$ and generates a correlation signal $R_C(T_R,t)$, where $R_C(T_R,t)$ is the complex correlation function. Every $T_R$-value thus corresponds to a distance slot. A subsequent doppler processor 216 processes time samples of the correlation signal $R_C(T_R,t)$ for all distance slots and produces a matrix whose complex figure elements represent reflected signal values from different distances and doppler frequencies. For example, by means of a threshold-procedure echoes of a certain minimum strength in respect of doppler and distance can be determined. From this information, in turn, distance information $Y(t)$ and velocity information $V(t)$ can be extracted for corresponding reflecting objects.

Figure 7:
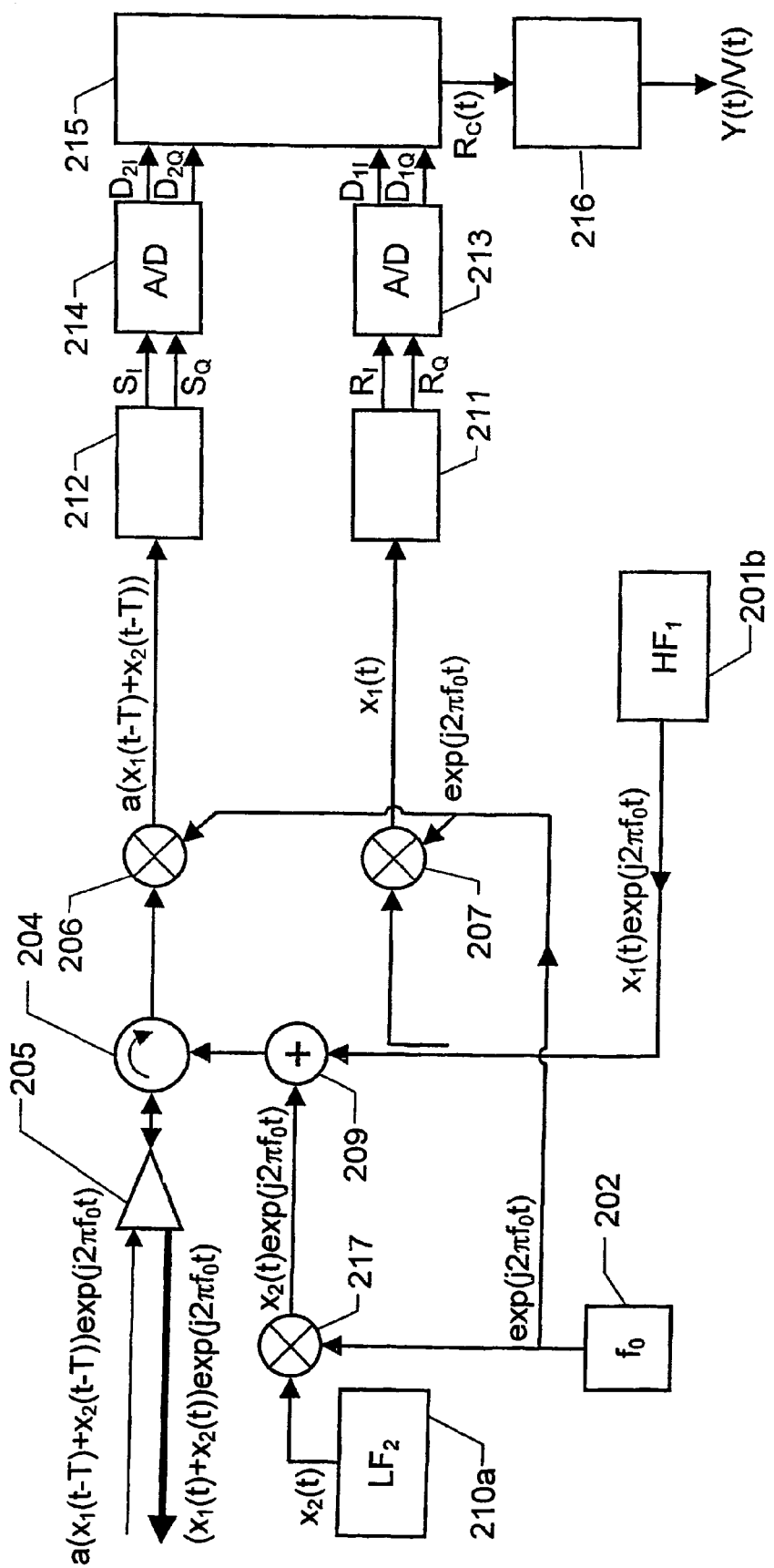
FIG. 7 shows a block diagram over a noise modulated signal transceiver according to a fourth embodiment of the invention.

FIG. 7 shows a block diagram over a noise modulated radar transceiver according to a fourth embodiment of the invention. In similarity with the preceding embodiment, a first noise signal $x_1(t)\exp(j2\pi f_0 t)$ from a high frequency noise generator 201b constitutes a basis for the transmitted radar signal. An adder 209, however, adds a second noise component $x_2(t)\exp(j2\pi f_0 t)$, which is based on a second noise signal $x_2(t)$ (uncorrelated with the first noise signal $x_1(t)\exp(j2\pi f_0 t)$) from a second noise generator 210a before the radar signal is transmitted. The second noise generator 210a delivers the second noise signal $x_2(t)$ to a modulator (mixer) 217, which likewise receives a high frequency periodic signal with a frequency $f_0$ from a local oscillator 202. A summation signal $(x_1(t)+x_2(t))\exp(j2\pi f_0 t)$ from the adder 209 is fed via a directional coupler 204 to an antenna system 205, via which subsequently a radar signal $(x_1(t)+x_2(t))\exp(j2\pi f_0 t)$ is transmitted. Preferably, the transmission chain as well as the reception chain include amplifiers and filters that are adapted to the bandwidth of the signals, which however not are shown in the figure.

In analogy with the earlier described embodiments of the invention, it is presumed that the transmitted radar signal $(x_1(t)+x_2(t))\exp(j2\pi f_0 t)$ is reflected by at least one object and is partly reflected to the radar transceiver in the form of an information carrying signal $a(x_1(t-T)+x_2(t-T))\exp(j2\pi f_0 t)$, which is received by the antenna system 205.

Thereafter, the information carrying signal $a(x_1(t-T)+x_2(t-T))\exp(j2\pi f_0 t)$ is fed to a down converter 206. This frequency down transforms down the information carrying signal $a(x_1(t-T)+x_2(t-T))\exp(j2\pi f_0 t)$ to a down converted signal $a(x_1(t-T)+x_2(t-T))$ (compare with $P_2(x_1, x_2)$ in FIG. 2) by mixing it with the output signal $f_0$ from a local oscillator 202. A signal component based on the first noise signal $x_1(t)\exp(j2\pi f_0 t)$ is returned as a leak signal to the receiver part of the radar transceiver. A second down converter receives this signal $x_1(t)\exp(j2\pi f_0 t)$ and frequency down converts it to a reference signal $x_1(t)$ (compare with $P_1(x_1)$ in FIG. 2)

A first quadrature demodulator 211 receives the reference signal $x_1(t)$ and generates primary demodulated signal components $R_I$ and $R_Q$ respectively. Correspondingly, a second quadrature demodulator 212 receives the summation signal $a(x_1(t-T)+x_2(t))$ and generates, based thereon, secondary demodulated signal components $S_I$ and $S_Q$ respectively. The primary demodulated signal components $R_I$ and $R_Q$ are fed to a first A/D-converter 213, which converts them to a set of primary digital signal components $D_{1I}, D_{1Q}$ and the secondary demodulated signal components $S_I$ and $S_Q$ are fed to a second A/D-converter 214, which converts them to a set of secondary digital signal components $D_{2I}, D_{2Q}$.

A correlator 215 receives the primary digital signal components $D_{1I}, D_{1Q}$ and the secondary digital signal components $D_{2I}, D_{2Q}$, correlates them mutually with a variable delay $T_R$ and generates a correlation signal $R_C(T_R,t)$, where $R_C(T_R,t)$ is the complex correlation function. Every $T_R$-value thus corresponds to a distance slot. A subsequent doppler processor 216 processes time samples of the correlation signal $R_C(T_R,t)$ for all distance slots and produces a matrix whose complex figure elements represent reflected signal values from different distances and doppler frequencies. For example, by means of a threshold-procedure echoes of a certain minimum strength in respect of doppler and distance can be determined. From this information, in turn, distance information $Y(t)$ and velocity information $V(t)$ can be extracted for corresponding reflecting objects.

Figure 8:
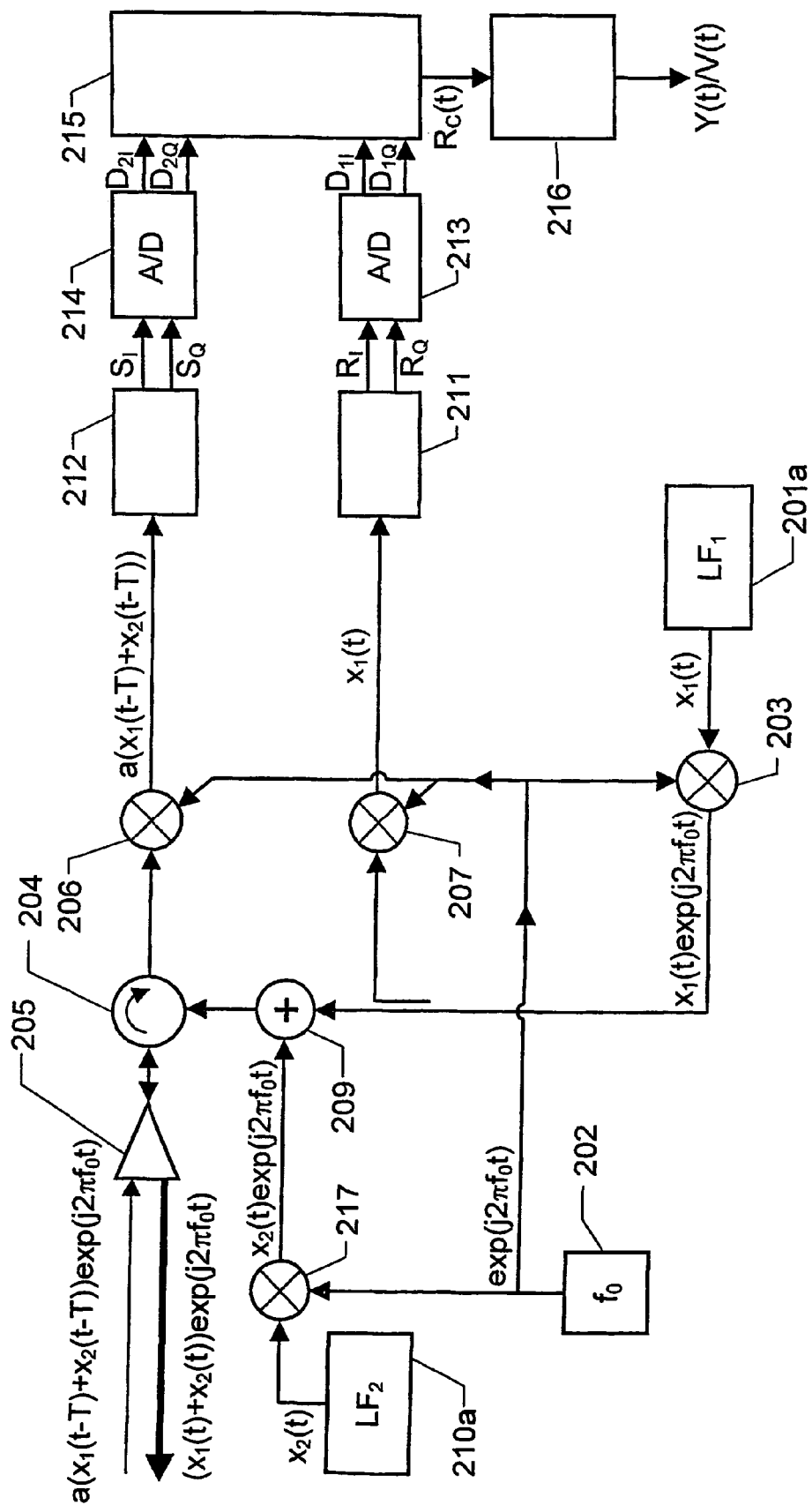
FIG. 8 shows a block diagram over a noise modulated signal transceiver according to a fifth embodiment of the invention.

FIG. 8 shows a block diagram over a noise modulated radar transceiver according to a fifth embodiment of the invention. The transmitted radar signal on one hand includes a first signal component $x_1(t)\exp(j2\pi f_0 t)$ based on a first noise signal $x_1(t)$ from a first noise generator 201a, which is up-converted in a first modulator 203 by means of a high frequency periodic signal $f_0$ from a local oscillator 202, and on the other hand a second signal component $x_2(t)\exp(j2\pi f_0 t)$ based on a second noise signal $x_2(t)$ from a second noise generator 210a. The second noise signal $x_2(t)$ is uncorrelated with the first noise signal $x_1(t)$. A second modulator 217 receives the second noise signal and the high frequency periodic signal $f_0$ from the local oscillator 202 and sums the first signal component $x_1(t)\exp(2\pi f_0 t)$ together with the second signal component $x_2(t)\exp(j2\pi f_0 t)$ into a summation signal $(x_1(t)+x_2(t))\exp(j2\pi f_0 t)$, which is fed out via a directional coupler 204 and an antenna system 205 as a radar signal $(x_1(t)+x_2(t))\exp(j2\pi f_0 t)$. Preferably, the transmission chain as well as the reception chain include amplifiers and filters that are adapted to the bandwidth of the signals, which however not are shown in the figure.

In analogy with the earlier described embodiments of the invention, it is presumed that the transmitted radar signal $(x_1(t)+x_2(t))\exp(j2\pi f_0 t)$ is reflected by at least one object and is partly reflected to the radar transceiver in the form of an information carrying signal $a(x_1(t-T)+x_2(t-T))\exp(j2\pi f_0 t)$, which is received by the antenna system 205.

Thereafter, the information carrying signal $a(x_1(t-T)+x_2(t-T))\exp(j2\pi f_0 t)$ is fed to a down converter 206. This frequency down transforms the information carrying signal $a(x_1(t-T)+x_2(t-T))\exp(j2\pi f_0 t)$ to a down converted signal $a(x_1(t-T)+x_2(t-T))$ (compare with $P_2(x_1, x_2)$ in FIG. 2) by mixing it with the output signal $f_0$ from a local oscillator 202. A signal component based on the first noise signal $x_1(t)\exp(j2\pi f_0 t)$ is returned as a leak signal to the receiver part of the radar transceiver. A second down converter receives this signal $x_1(t)\exp(j2\pi f_0 t)$ and frequency down converts it to a reference signal $x_1(t)$ (compare with $P_1(x_1)$ in FIG. 2)

A first quadrature demodulator 211 receives the reference signal $x_1(t)$ and generates primary demodulated signal components $R_I$ and $R_Q$ respectively. Correspondingly, a second quadrature demodulator 212 receives the summation signal $a(x_1(t-T)+x_2(t))$ and generates, based thereon, secondary demodulated signal components $S_I$ and $S_Q$ respectively. The primary demodulated signal components $R_I$ and $R_Q$ are fed to a first A/D-converter 213, which converts them to a set of primary digital signal components $D_{1I}$, $D_{1Q}$ and the secondary demodulated signal components $S_I$ and $S_Q$ are fed to a second A/D-converter 214, which converts them to a set of secondary digital signal components $D_{2I}$, $D_{2Q}$.

A correlator 215 receives the primary digital signal components $D_{1I}$, $D_{1Q}$ and the secondary digital signal components $D_{2I}$, $D_{2Q}$, correlates them mutually with a variable delay $T_R$ and generates a correlation signal $R_C(T_R,t)$, where $R_C(T_R,t)$ is the complex correlation function. Every $T_R$-value thus corresponds to a distance slot. A subsequent doppler processor 216 processes time samples of the correlation signal $R_C(T_R,t)$ for all distance slots and produces a matrix whose complex figure elements represent reflected signal values from different distances and doppler frequencies. For example, by means of a threshold-procedure echoes of a certain minimum strength in respect of doppler and distance can be determined. From this information, in turn, distance information Y(t) and velocity information V(t) can be extracted for corresponding reflecting objects.

Figure 9:
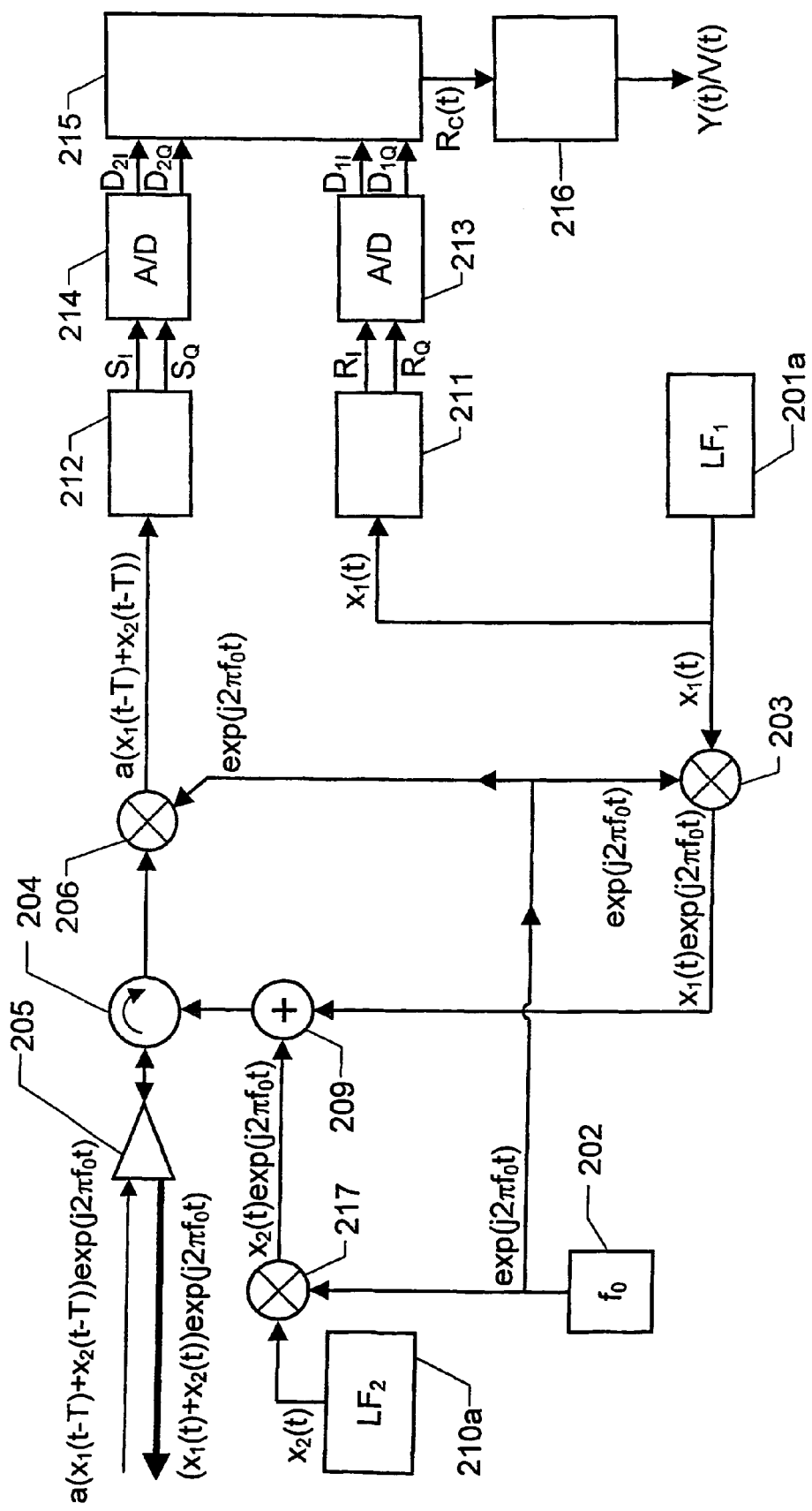
FIG. 9 shows a block diagram over a noise modulated signal transceiver according to a sixth embodiment of the invention.

FIG. 9 shows a block diagram over a noise modulated radar transceiver according to a sixth embodiment of the invention. The transmitted radar signal on one hand includes a first signal component $x_1(t)\exp(j2\pi f_0 t)$ based on a first noise signal $x_1(t)$ from a first noise generator 201a, which is up-converted in a first modulator 203 by means of a high frequency periodic signal $f_0$ from a local oscillator 202, and on the other hand a second signal component $x_2(t)\exp(j2\pi f_0 t)$ based on a second noise signal $x_2(t)$ from a second noise generator 210a. The second noise signal $x_2(t)$ is uncorrelated with the first noise signal $x_1(t)$. A modulator 217 receives the second noise signal and the high frequency periodic signal $f_0$ from the local oscillator 202 and forms the second signal component $x_2(t)\exp(j2\pi f_0 t)$. An adder 209 sums the first noise signal $x_1(t)\exp(j2\pi f_0 t)$ and the second signal component $x_2(t)\exp(j2\pi f_0 t)$ into a summation signal $(x_1(t)+x_2(t))\exp(j2\pi f_0 t)$, which is fed out via a directional coupler 204 and an antenna system 205 as a radar signal $(x_1(t)+x_2(t))\exp(j2\pi f_0 t)$. Preferably, the transmission chain as well as the reception chain include amplifiers and filters that are adapted to the bandwidth of the signals, which however not are shown in the figure.

It is also here presumed that the transmitted radar signal $(x_1(t)+x_2(t))\exp(2\pi f_0 t)$ is reflected by at least one object and is partly reflected to the radar transceiver in the form of an information carrying signal $a(x_1(t-T)+x_2(t-T))\exp(j2\pi f_0 t)$, which is received by the antenna system 205.

Thereafter, the information carrying signal $a(x_1(t-T)+x_2(t-T))\exp(j2\pi f_0 t)$ is fed to a down converter 206. This frequency down transforms the information carrying signal $a(x_1(t-T)+x_2(t-T))\exp(j2\pi f_0 t)$ to a down converted signal $a(x_1(t-T)+x_2(t-T))$ (compare with $P_2(x_1, x_2)$ in FIG. 2) by mixing it with the output signal $f_0$ from a local oscillator 202. The first noise signal $x_1(t)$ is returned as a reference signal $x_1(t)$ directly from the first noise generator 201a to the receiver part of the radar transceiver (compare with $P_1(x_1)$ in FIG. 2).

A first quadrature demodulator 211 receives the reference signal $x_1(t)$ and generates primary demodulated signal components $R_I$ and $R_Q$ respectively. Correspondingly, a second quadrature demodulator 212 receives the summation signal $a(x_1(t-T)+x_2(t))$ and generates, based thereon, secondary demodulated signal components $S_I$ and $S_Q$ respectively. The primary demodulated signal components $R_I$ and $R_Q$ are fed to a first A/D-converter 213, which converts them to a set of primary digital signal components $D_{1I}$, $D_{1Q}$ and the secondary demodulated signal components $S_I$ and $S_Q$ are fed to a second A/D-converter 214, which converts them to a set of secondary digital signal components $D_{2I}$, $D_{2Q}$.

A correlator 215 receives the primary digital signal components $D_{1I}$, $D_{1Q}$ and the secondary digital signal components $D_{2I}$, $D_{2Q}$, correlates them mutually with a variable delay $T_R$ and generates a correlation signal $R_C(T_R,t)$, where $R_C(T_R,t)$ is the complex correlation function. Every $T_R$-value thus corresponds to a distance slot. A subsequent doppler processor 216 processes time samples of the correlation signal $R_C(T_R,t)$ for all distance slots and produces a matrix whose complex figure elements represent reflected signal values from different distances and doppler frequencies. For example, by means of a threshold-procedure echoes of a certain minimum strength in respect of doppler and distance can be determined. From this information, in turn, distance information Y(t) and velocity information V(t) can be extracted for corresponding reflecting objects.

Figure 10:
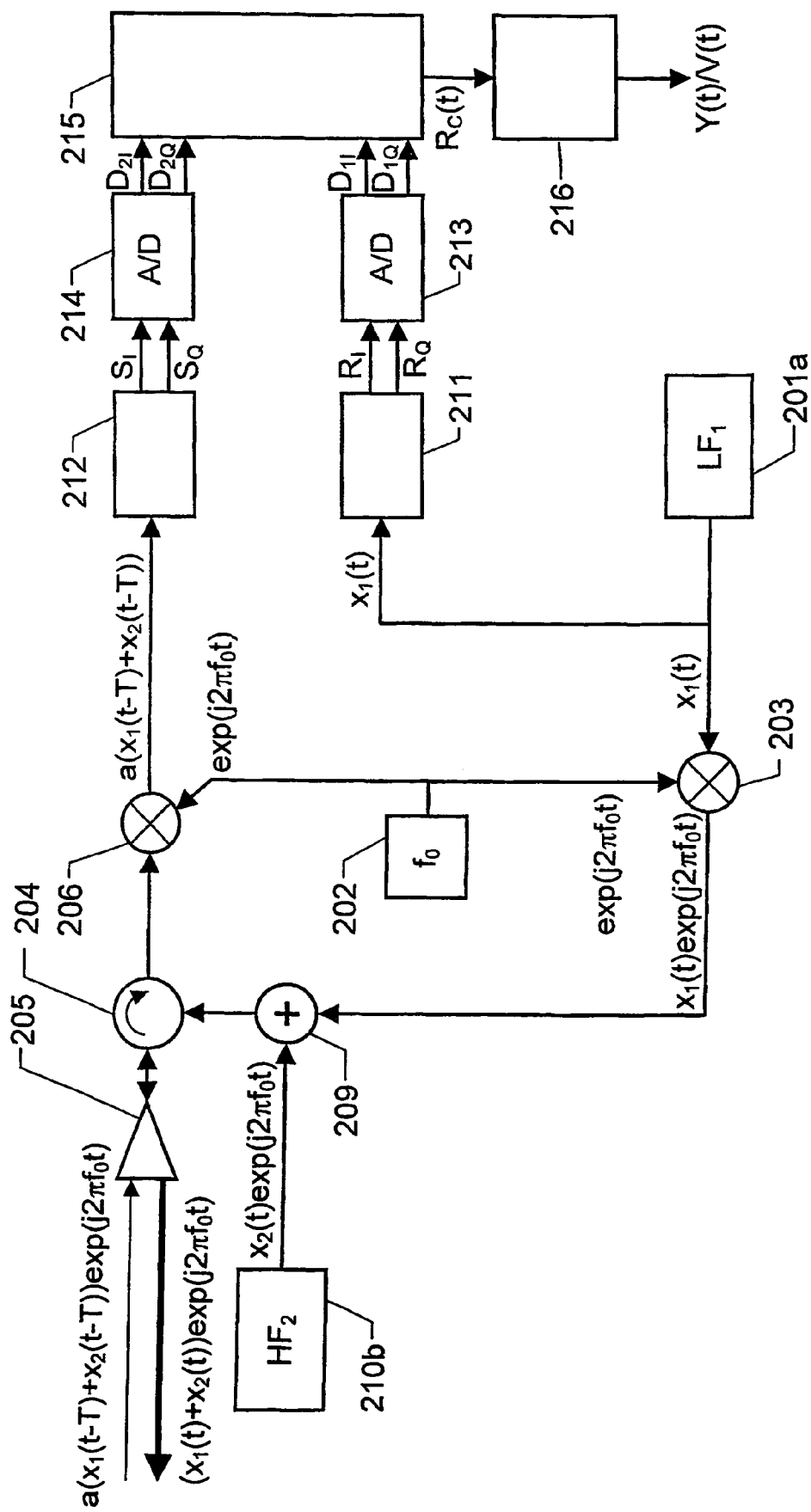
FIG. 10 shows a block diagram over a noise modulated signal transceiver according to a seventh embodiment of the invention.

FIG. 10 shows a block diagram over a noise modulated radar transceiver according to a seventh embodiment of the invention. Also here, the transmitted radar signal on one hand includes a first signal component $x_1(t)\exp(j2\pi f_0 t)$ based on a first noise signal $x_1(t)$, and on the other hand a second noise signal $x_2(t)\exp(j2\pi f_0 t)$, which is uncorrelated with the first noise signal $x_1(t)$.

A first and comparatively low frequency noise generator 201a delivers the first noise signal $x_1(t)$ to a modulator 203, which also receives a high frequency periodic signal at a frequency $f_0$ from a local oscillator 202. The modulator 203 forms, on basis thereof, the first signal component $x_1(t)\exp(j2\pi f_0 t)$. The second noise signal $x_2(t)\exp(j2\pi f_0 t)$ is produced by a second noise generator 201b.

An adder 209 adds together the first signal component $x_1(t)\exp(j2\pi f_0 t)$ and the second noise signal $x_2(t)\exp(j2\pi f_0 t)$ to a summation signal $(x_1(t)+x_2(t))\exp(j2\pi f_0 t)$, which is fed out via a directional coupler 204 and an antenna system 205 as a radar signal $(x_1(t)+x_2(t))\exp(j2\pi f_0 t)$. Preferably, the transmission chain as well as the reception chain include amplifiers and filters that are adapted to the bandwidth of the signals, which however not are shown in the figure.

It is also here presumed that the transmitted radar signal $(x_1(t)+x_2(t))\exp(j2\pi f_0 t)$ is reflected by at least one object and is partly reflected to the radar transceiver in the form of an information carrying signal $a(x_1(t-T)+x_2(t-T))\exp(j2\pi f_0 t)$, which is received by the antenna system 205.

Thereafter, the information carrying signal $a(x_1(t-T)+x_2(t-T))\exp(j2\pi f_0 t)$ is fed to a down converter 206. This frequency down transforms the information carrying signal $a(x_1(t-T)+x_2(t-T))\exp(j2\pi f_0 t)$ to a down converted signal $a(x_1(t-T)+x_2(t-T))$ (compare with $P_2(x_1, x_2)$ in FIG. 2) by mixing it with the output signal $f_0$ from the local oscillator 202. The first noise signal $x_1(t)$ is returned as a reference signal $x_1(t)$ directly from the first noise generator 201*a* to the receiver part of the radar transceiver (compare with $P_1(x_1)$ in FIG. 2).

A first quadrature demodulator 211 receives the reference signal $x_1(t)$ and generates primary demodulated signal components $R_I$ and $R_Q$ respectively. Correspondingly, a second quadrature demodulator 212 receives the summation signal $a(x_1(t-T)+x_2(t))$ and generates, based thereon, secondary demodulated signal components $S_I$ and $S_Q$ respectively. The primary demodulated signal components $R_I$ and $R_Q$ are fed to a first A/D-converter 213, which converts them to a set of primary digital signal components $D_{1I}, D_{1Q}$ and the secondary demodulated signal components $S_I$ and $S_Q$ are fed to a second A/D-converter 214, which converts them to a set of secondary digital signal components $D_{2I}, D_{2Q}$.

A correlator 215 receives the primary digital signal components $D_{1I}, D_{1Q}$ and the secondary digital signal components $D_{2I}, D_{2Q}$, correlates them mutually with a variable delay $T_R$ and generates a correlation signal $R_C(T_R,t)$, where $R_C(T_R,t)$ is the complex correlation function. Every $T_R$-value thus corresponds to a distance slot. A subsequent doppler processor 216 processes time samples of the correlation signal $R_C(T_R,t)$ for all distance slots and produces a matrix whose complex figure elements represent reflected signal values from different distances and doppler frequencies. For example, by means of a threshold-procedure echoes of a certain minimum strength in respect of doppler and distance can be determined. From this information, in turn, distance information Y(t) and velocity information V(t) can be extracted for corresponding reflecting objects.

Figure 11:
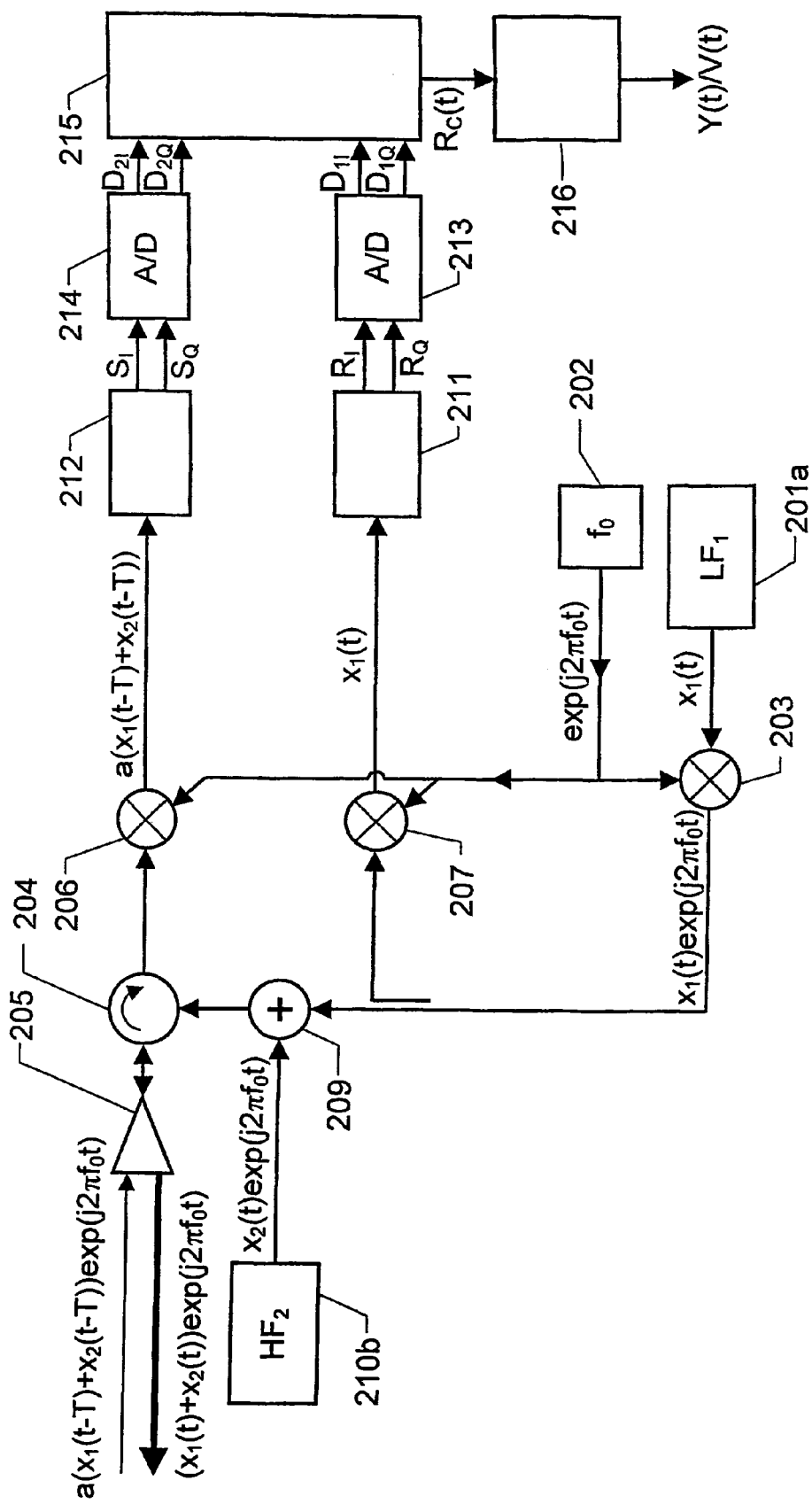
FIG. 11 shows a block diagram over a noise modulated signal transceiver according to a eighth embodiment of the invention.

FIG. 11 shows a block diagram over a noise modulated radar transceiver according to an eighth embodiment of the invention. The transmitted radar signal includes a first signal component $x_1(t)\exp(j2\pi f_0 t)$ based on a first noise signal $x_1(t)$ and a second noise signal $x_2(t)\exp(j2\pi f_0 t)$, which is uncorrelated with the first noise signal $x_1(t)$.

A first and comparatively low frequency noise generator 201*a* delivers the first noise signal $x_1(t)$ to a modulator 203, which also receives a high frequency periodic signal at a frequency $f_0$ from a local oscillator 202. The modulator 203 forms, on basis thereof, the first signal component $x_1(t)\exp(j2\pi f_0 t)$. The second noise signal $x_2(t)\exp(j2\pi f_0 t)$ is produced by a second and comparatively high frequency noise generator 210*b*.

An adder 209 adds together the first signal component $x_1(t)\exp(j2\pi f_0 t)$ and the second noise signal $x_2(t)\exp(j2\pi f_0 t)$ to a summation signal $(x_1(t)+x_2(t))\exp(j2\pi f_0 t)$, which is fed out via a directional coupler 204 and an antenna system 205 as a radar signal $(x_1(t)+x_2(t))\exp(j2\pi f_0 t)$. Preferably, the transmission chain as well as the reception chain include amplifiers and filters that are adapted to the bandwidth of the signals, which however not are shown in the figure.

The transmitted radar signal $(x_1(t)+x_2(t))\exp(j2\pi f_0 t)$ is presumed to be reflected by at least one object and is partly reflected to the radar transceiver in the form of an information carrying signal $a(x_1(t-T)+x_2(t-T))\exp(j2\pi f_0 t)$, which is received by the antenna system 205.

Thereafter, the information carrying signal $a(x_1(t-T)+x_2(t-T))\exp(j2\pi f_0 t)$ is fed to a down converter 206. This frequency down transforms the information carrying signal $a(x_1(t-T)+x_2(t-T))\exp(j2\pi f_0 t)$ to a down converted signal $a(x_1(t-T)+x_2(t-T))$ (compare with $P_2(x_1, x_2)$ in FIG. 2) by mixing it with the output signal $f_0$ from a local oscillator 202. The first noise signal $x_1(t)$ is returned as a leak signal to the receiver part of the radar transceiver. A second down converter 207 receives this signal $x_1(t)\exp(j2\pi f_0 t)$ and frequency down converts it into a reference signal $x_1(t)$ (compare with $P_1(x_1)$ in FIG. 2).

A first quadrature demodulator 211 receives the reference signal $x_1(t)$ and generates primary demodulated signal components $R_I$ and $R_Q$ respectively. Correspondingly, a second quadrature demodulator 212 receives the summation signal $a(x_1(t-T)+x_2(t))$ and generates, based thereon, secondary demodulated signal components $S_I$ and $S_Q$ respectively. The primary demodulated signal components $R_I$ and $R_Q$ are fed to a first A/D-converter 213, which converts them to a set of primary digital signal components $D_{1I}, D_{1Q}$ and the secondary demodulated signal components $S_I$ and $S_Q$ are fed to a second A/D-converter 214, which converts them to a set of secondary digital signal components $D_{2I}, D_{2Q}$.

A correlator 215 receives the primary digital signal components $D_{1I}, D_{1Q}$ and the secondary digital signal components $D_{2I}, D_{2Q}$, correlates them mutually with a variable delay $T_R$ and generates a correlation signal $R_C(T_R,t)$, where $R_C(T_R,t)$ is the complex correlation function. Every $T_R$-value thus corresponds to a distance slot. A subsequent doppler processor 216 processes time samples of the correlation signal $R_C(T_R,t)$ for all distance slots and produces a matrix whose complex figure elements represent reflected signal values from different distances and doppler frequencies. For example, by means of a threshold-procedure echoes of a certain minimum strength in respect of doppler and distance can be determined. From this information, in turn, distance information Y(t) and velocity information V(t) can be extracted for corresponding reflecting objects.

Figure 12:
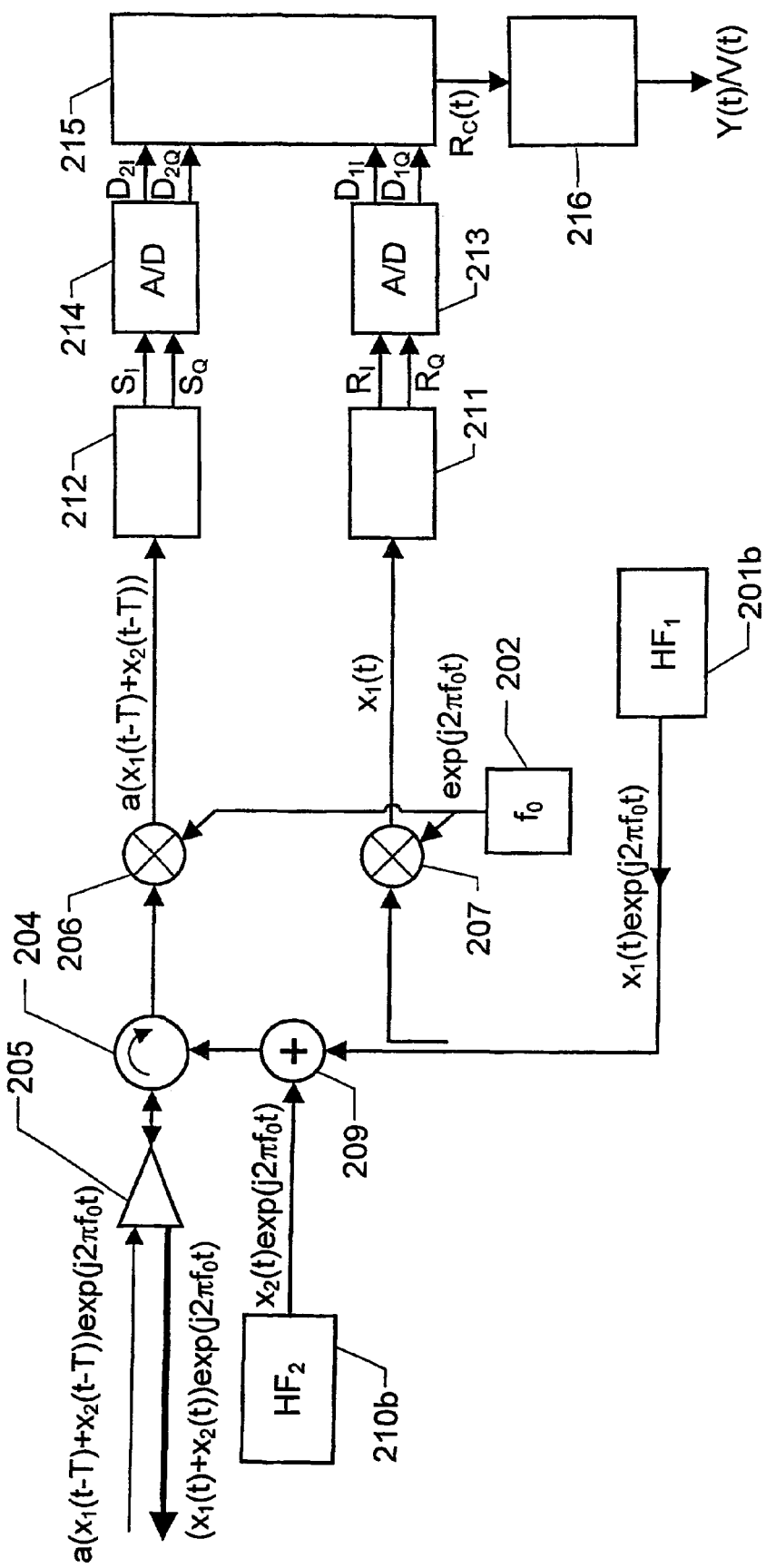
FIG. 12 shows a block diagram over a noise modulated signal transceiver according to a ninth embodiment of the invention.

FIG. 12 shows a block diagram over a noise modulated radar transceiver according to a ninth embodiment of the invention. The transmitted radar signal includes a first noise signal $x_1(t)\exp(j2\pi f_0 t)$ and a second noise signal $x_2(t)\exp(j2\pi f_0 t)$, which is uncorrelated with the first noise signal $x_1(t)\exp(j2\pi f_0 t)$.

A first and comparatively high frequency noise generator 201*a* delivers the first noise signal $x_1(t)\exp(j2\pi f_0 t)$ to an adder 209. The adder 209 also receives the second noise signal $x_2(t)\exp(j2\pi f_0 t)$ from a second and comparatively high frequency noise generator 210*b*. The adder 209 adds together the first noise signal $x_1(t)\exp(j2\pi f_0 t)$ and the second noise signal $x_2(t)\exp(j2\pi f_0 t)$ to a summation signal $(x_1(t)+x_2(t))\exp(j2\pi f_0 t)$, which is fed out via a directional coupler 204 and an antenna system 205 as a radar signal $(x_1(t)+x_2(f))\exp(j2\pi f_0 t)$. Preferably, the transmission chain as well as the reception chain include amplifiers and filters that are adapted to the bandwidth of the signals, which however not are shown in the figure.

The transmitted radar signal $(x_1(t)+x_2(t))\exp(j2\pi f_0 t)$ is presumed to be reflected by at least one object and is partly reflected to the radar transceiver in the form of an information carrying signal $a(x_1(t-T)+x_2(t-T))\exp(j2\pi f_0 t)$, which is received by the antenna system 205.

Thereafter, the information carrying signal $a(x_1(t-T)+x_2(t-T))\exp(j2\pi f_0 t)$ is fed to a down converter 206. This frequency down transforms the information carrying signal $a(x_1(t-T)+x_2(t-T))\exp(j2\pi f_0 t)$ to a down converted signal $a(x_1(t-T)+x_2(t-T))$ (compare with $P_2(x_1, x_2)$ in FIG. 2) by mixing it with the output signal $f_0$ from the local oscillator 202. The first noise signal $x_1(t)$ is returned as a leak signal to the receiver part of the radar transceiver. A second down converter 207 receives this signal $x_1(t)\exp(j2\pi f_0 t)$ and frequency down converts it into a reference signal $x_1(t)$ (compare with $P_1(x_1)$ in FIG. 2).

A first quadrature demodulator 211 receives the reference signal $x_1(t)$ and generates primary demodulated signal components $R_I$ and $R_Q$ respectively. Correspondingly, a second quadrature demodulator 212 receives the summation signal $a(x_1(t-T)+x_2(t))$ and generates, based thereon, secondary demodulated signal components $S_I$ and $S_Q$ respectively. The primary demodulated signal components $R_I$ and $R_Q$ are fed to a first A/D-converter 213, which converts them to a set of primary digital signal components $D_{1I}$, $D_{1Q}$ and the secondary demodulated signal components $S_I$ and $S_Q$ are fed to a second A/D-converter 214, which converts them to a set of secondary digital signal components $D_{2I}$, $D_{2Q}$.

A correlator 215 receives the primary digital signal components $D_{1I}$, $D_{1Q}$ and the secondary digital signal components $D_{2I}$, $D_{2Q}$, correlates them mutually with a variable delay $T_R$ and generates a correlation signal $R_C(T_R,t)$, where $R_C(T_R,t)$ is the complex correlation function. Every $T_R$-value thus corresponds to a distance slot. A subsequent doppler processor 216 processes time samples of the correlation signal $R_C(T_R,t)$ for all distance slots and produces a matrix whose complex figure elements represent reflected signal values from different distances and doppler frequencies. For example, by means of a threshold-procedure echoes of a certain minimum strength in respect of doppler and distance can be determined. From this information, in turn, distance information Y(t) and velocity information V(t) can be extracted for corresponding reflecting objects.

Figure 13:
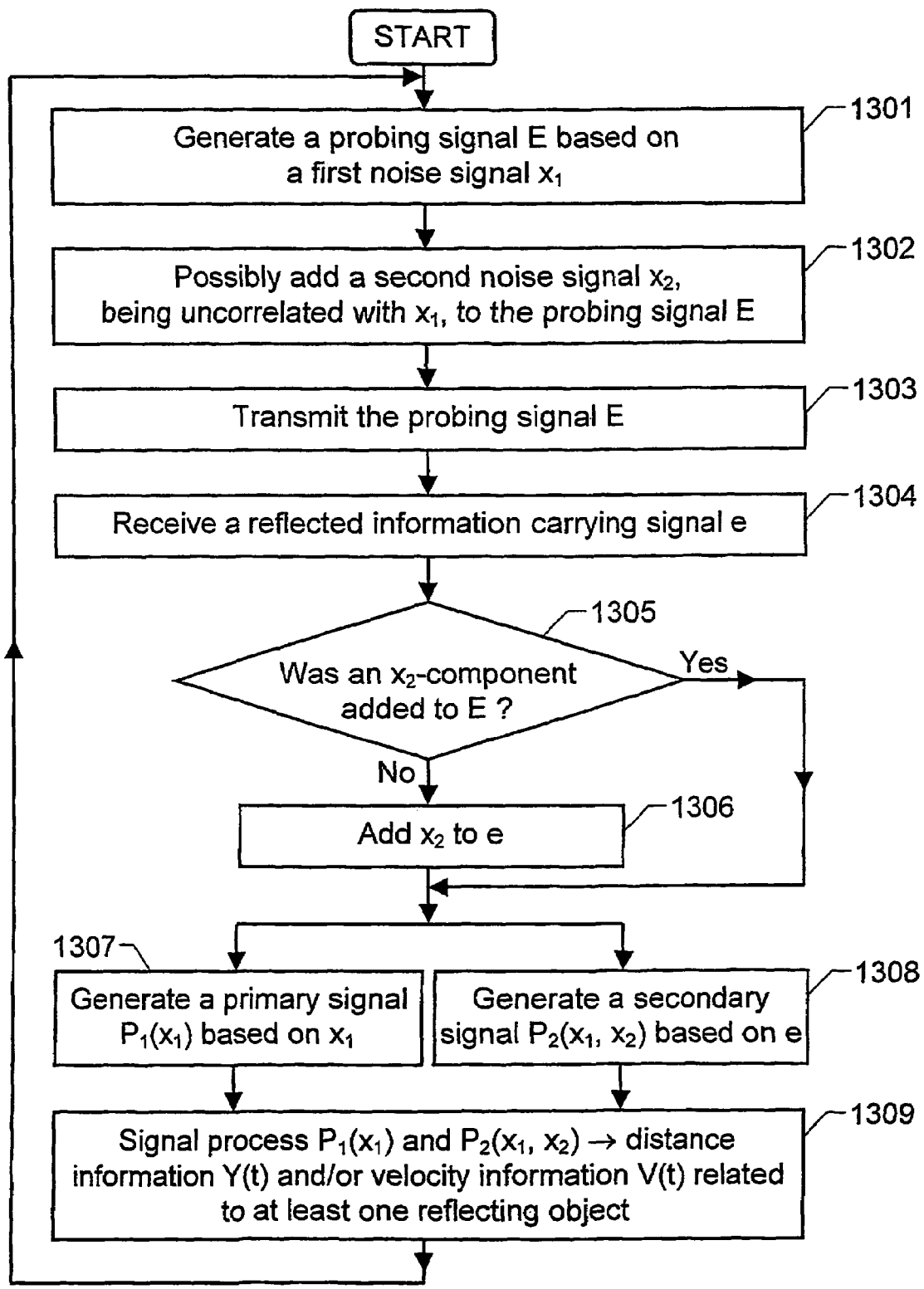
FIG. 13 illustrates, by means of a flow diagram, the over all method according to the invention.

A flow diagram is found in FIG. 13, which illustrates the overall method according to the invention. A first step 1301 generates a probing signal, which at least is based on a first noise signal $x_1$. In a subsequent step 1302 a second noise signal $x_2$, is possibly added which is uncorrelated with the first noise signal $x_1$. Thereafter, a step 1303 transmits the radar signal.

An information carrying signal having been reflected against at least one reflecting object is received in a following step 1304. A step 1305 then investigates whether a second noise signal $x_2$ was added to the probing signal in step 1303. If this was the case, the procedure continues directly in parallel steps 1307 and 1308. Otherwise, the second noise signal $x_2$ is added to the information carrying signal in a step 1306.

Then, the step 1307 generates a primary signal based on the first noise signal $x_1$. In parallel therewith, the step 1308 generates a secondary signal based on the information carrying signal, which thus comprises a signal component including the first noise signal $x_1$ as well as a signal component including the second noise signal $x_2$. A final step 1309 signal processes the primary and the secondary signal, whereby at least one of distance information and velocity information pertaining to the reflecting object is generated.

It should be noted that although the steps according to the flow diagram in FIG. 13 are performed sequentially, this is only true with regard to infinitesimal segments of the relevant signals. Namely, while for example a particular segment of the probing signal is transmitted, an earlier transmitted and received segment of the same signal is processed, and so on.

The invention may preferably be applied at remote distance measurement by means of a digital group antenna system. The digital group antenna system may utilize probing signals of radar type as well as sonar type. Reconnaissance radar systems, fire-control radar systems, target seeker systems, proximity fuses and altimeters constitute further application examples of the invention. The latter may, in turn, include one or more digital group antenna systems.

According to the invention, lobe shaping and lobe control are synthesized via the output signals from two or more correlators 215. The doppler correlation function for narrow band noise based on a single noise signal $x_1$ and one reflecting object is, after sign detection, described by the equations (I) and (Q) above. As mentioned earlier, it is from these equations then possible to define the correlation function according to:

$$R_C(T,T_R)=R_r(T,T_R)+jR_i(T,T_R).$$

If $\rho(T-T_R)$ in the equations (I) and (Q) is reduced, as is proposed according to the invention, by adding a second noise signal $x_2$, which is uncorrelated with the first noise signal $x_1$, such that $\arcsin(x)\approx x$, the following approximation is true:

$$R_C(T,T_R)\approx A\rho(T-T_R)\exp[j\omega_0(T-T_R)]$$

where the phase term's linear variation in time via T defines the doppler frequency and where $\rho(T-T_R)$ has its correlation maximum where $T_R\approx T$.

If two or more antenna units (m=0, ..., m=M) in a line array according to FIG. 14 are used jointly to transmit probing signals and to receive information carrying signals, where the antenna units are positioned at mutually equidistant distances d, a delay T from a first antenna unit m=0 will vary in relation to the other antenna units m=1 to m=M (where a maximum distance D=M·d) the correlation function can be written:

$$R_C(m,T,T_R)\approx A\rho(T-T_R)\exp[j\omega_0(T_m-T_R)],$$

which, due to the geometry, also can be expressed:

$$R_C(m,T,T_R)\approx A\rho(T-T_R)\exp[j\omega_0(T_0-T_R)+j\delta_m],$$

where $\delta_m=4\pi dm\sin(\phi)/\lambda$ $\phi$=the probing signal's direction in relation to a vertical reference direction from the line array, and $\lambda$=the probing signal's wavelength In course of the lobe synthesizing, an amplification is obtained in the direction $\phi$ by multiplying the output signals after the correlation calculation with the complex number $\exp[-j\epsilon_m]$ and adding the respective correlation signal (from m=0 to m=M), i.e.:

$$R_C(\phi,T,T_R)=\Sigma R_C(m,T,T_R)\exp[-j4\pi dm \sin (\phi)/\lambda],$$

which in turn can be reformulated with $\Delta\delta=4\pi d\sin(\phi)/\lambda$ as:

$$R_C(\phi,T,T_R)=\Sigma R_C(m,T,T_R)\exp[-jm\Delta\delta]$$

If the representation $\phi_n=n\Delta\phi$ for n=0, 1, ..., M is used, the following becomes true: $\Delta\delta=4\pi d\sin(n\Delta\phi)/\lambda$, which whenever $n\Delta\phi<1$, may be approximated with $\Delta\delta=4\pi dn\Delta\phi/\lambda$. For $d=\lambda/2$, $\Delta\delta=2\pi n\Delta\phi$. Entry into the correlation sum above gives:

$$R_C(n\Delta\phi,T,T_R)\approx\Sigma R_C(m,T,T_R)\exp[-j2\pi nm\Delta\phi]$$

from which it is apparent that a number M sub-lobes can be generated by means of FFT of a vector $\{R_C(m,T,T_R)\}$, where m=$\{0, 1, ..., M\}$. Correspondingly, sub-lobes may be generated from a rectangular antenna array (with equidistant positioning of the antenna units) by means of a two dimensional Fourier transform. A circular geometry or curved antenna apertures require special algorithms which are described in the antenna synthesis theory.

Figure 15:
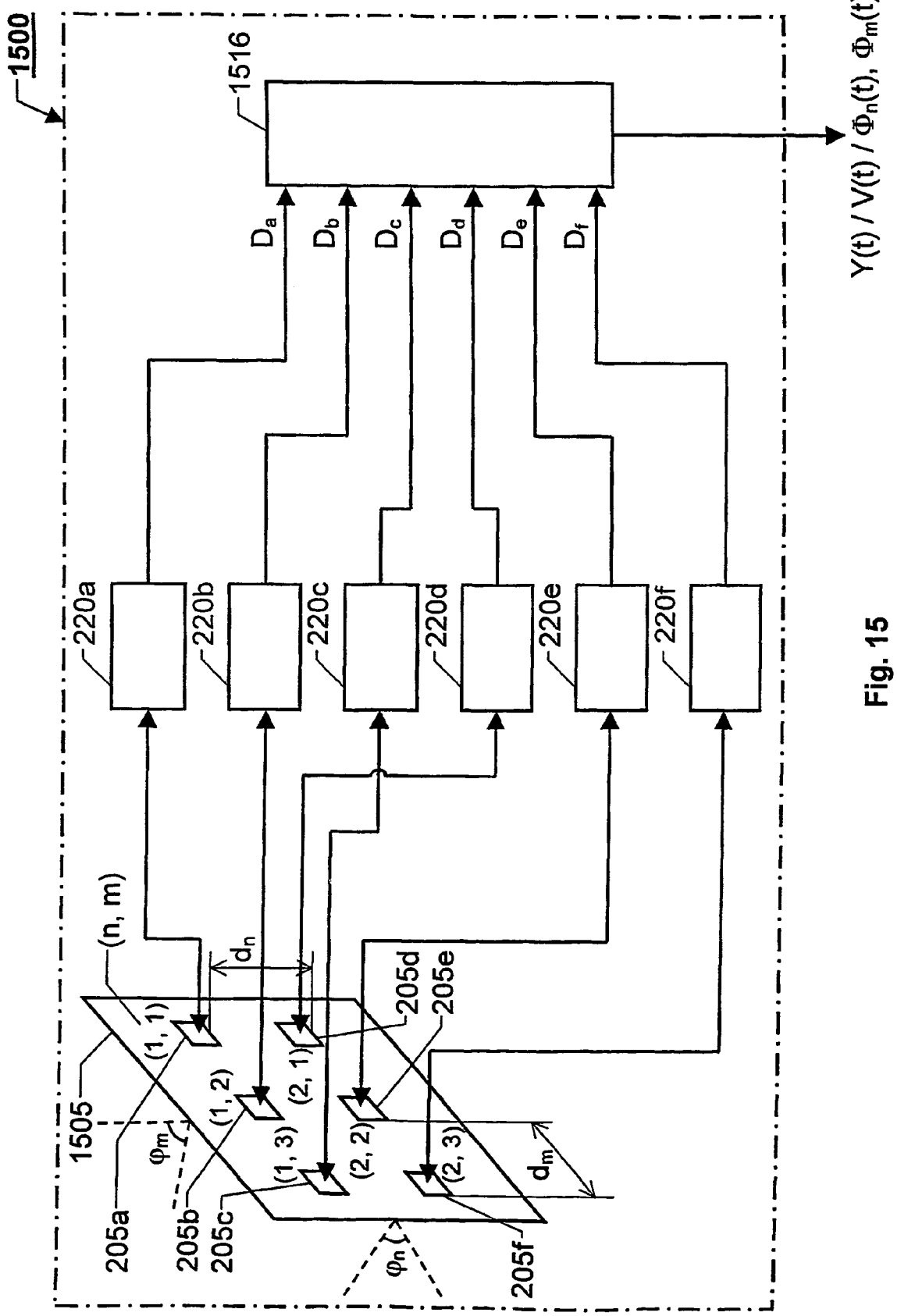
FIG. 15 shows a block diagram over a digital group antenna system according to an embodiment of the invention.

FIG. 15 shows a block diagram over a digital group antenna system 1500 according to an embodiment of the invention. The group antenna system includes an antenna aperture 1505 over which six antenna units 205a–205f are distributed according to a check pattern at horizontal m and vertical n mutually equidistant distances $d_m$; $d_n$ from each other.

A respective signal transceiver 200a–200f transmits probing signals and receives information carrying signals via the antenna units 205a–205f. The signal transceivers 200a–200f each delivers data $D_a$–$D_f$ after correlation forming and doppler processing to a common lobe processor 1516, which on basis of this data $D_a$–$D_f$ produces distance information Y(t), velocity information V(t) and angular information in horizontal direction $\Phi_m(t)$ and vertical direction $\Phi_n(t)$ respectively related to signal reflecting objects within the range of the digital group antenna system 1500.

Naturally, the group antenna system 1500 may be realized by means of alternative embodiments. These are, however, not illustrated by means of any figures, but are described in short below.

Generally, the group antenna radar system 1500 includes processors for distance determination in a number of distance slots (by means of a step-wise correlation procedure), velocity determination (by means of doppler filtering or FFT) and determination of angular positions of reflecting objects (by utilizing phase information from signals that have been received via different antenna units). Parts of the signal processing may either take place in parallel units as shown in FIG. 15 or in one or more common units. The signal processing after digitizing is preferably effectuated in a common processor. A held-together signal processing is, in fact, demanded first when producing the angular information, i.e. the information that the lobe processor 1516 generates. Parts of the signal processing may also be performed in reverse order.

The invention is not restricted to the embodiments described with reference to the figures, but may be varied freely within the scope of the subsequent claims.

Particularly, the invention is not restricted to embodiments where a common antenna/vibrating element is employed both for transmission of probing signals and reception of probing signals, however separate antennae may equally well be utilized for transmission and reception respectively.

The invention is not either restricted to embodiments where the received information carrying signal is processed in a separate down converter 206 respective a separate quadrature demodulator 212, however demodulation of the information carrying signal into at least one secondary demodulated signal component may in some cases be performed in an integrated unit. Correspondingly, the down converter 207 and the quadrature demodulator 211 may be integrated into a common unit.

What is claimed is:

1. A method for remote distance measurement of signal reflecting objects in relation to a signal transceiver comprising:
   transmitting a probing signal which is based on a first noise signal,
   receiving an information carrying signal, which constitutes a reflected version of the transmitted probing signal having been reflected against at least one reflecting object,
   generating a primary signal on basis of the first noise signal,
   generating a secondary signal on basis of the information carrying signal, and
   signal processing the primary signal and the secondary signal, whereby at least one of a distance and a relative velocity to the at least one reflecting object is determined,
   wherein the signal processing comprises adding a second noise signal, which is uncorrelated to the first noise signal, to one of the transmitted probing signal and the information carrying signal, such that the secondary signal includes a signal component based on the first noise signal as well as a signal component based on the second noise signal.

2. The method according to claim 1, wherein the signal processing comprises:
   correlating between at least one first signal based on the primary signal and at least one second signal based on the secondary signal, whereby a correlation signal is generated, and
   processing the correlation signal, whereby distance information related to the at least one reflecting object is generated.

3. The method according to claim 2, wherein the signal processing comprises doppler processing of the correlation signal, whereby velocity information related to the at least one reflecting object is generated.

4. The method according to claim 3, wherein the signal processing comprises:
   quadrature modulating the primary signal to obtain primary demodulated signal components, and
   quadrature modulating the secondary signal to obtain secondary demodulated signal components.

5. The method according to claim 4, wherein the signal processing comprises:
   digitizing the primary demodulated signal components into primary digital signal components, and
   digitizing the secondary demodulated signal components into secondary digital signal components.

6. The method according to claim 5, wherein the digitizing is performed at a low resolution in relation to the amplitude information in the primary signal respective the secondary signal.

7. The method according to claim 6, wherein the digitizing comprises binary A/D-conversion.

8. The method according to claim 5, wherein generating the correlation signal comprises correlating the primary digital signal components with the secondary digital signal components.

9. The method according to claim 1, wherein the transmitted probing signal comprises non-periodic Gaussian noise.

10. The method according to claim 1, wherein the transmitted probing signal comprises a pseudo noise signal.

11. The method according to claim 1, wherein the transmitted probing signal comprises a sine wave signal which is phase/frequency modulated with a noise signal.

12. The method according to claim 1, wherein the transmitted probing signal is pulse shaped.

13. The method according to claim 1, wherein generating the distance information comprises systematically shifting the secondary digital signal components in relation to the primary digital signal components, and calculating a correlation value for each respective shifting.

14. The method according to claim 13, wherein the shifting of the secondary digital signal components is performed in certain steps, where each step corresponds to a distance slot.

15. The method according to claim 2, wherein the doppler processing comprises fast Fourier transforming.

16. The method according to claim 2, wherein the doppler processing comprises binary Hadamard transforming.

17. The method according to claim 1, wherein the probing signal comprises a radar signal.

18. The method according to claim 1, wherein the probing signal comprises a sonar signal.

19. A signal transceiver for remote distance measurement of signal reflecting objects comprising a transmitter for transmitting a probing signal based on a first noise signal and a receiver for receiving an information carrying signal having been transmitted from the transmitter and been reflected by at least one reflecting object, the receiver in turn comprising:
   first signal generating means for receiving the first noise signal and based thereon generating a primary signal,
   second signal generating means for receiving the information carrying signal and based thereon generating a secondary signal, and
   signal processing means for receiving the primary signal and the secondary signal and based thereon generating at least one of distance information and relative velocity information pertaining to the at least one reflecting object,
   wherein the signal transceiver comprises adding means for adding a second noise signal, which is uncorrelated with the first noise signal, to one of the transmitted probing signal and the information carrying signal, such that the secondary signal includes a signal component based on the first noise signal as well as a signal component based on the second noise signal.

20. The signal transceiver according to claim 19, wherein the receiver comprises a correlator for receiving at least one first signal based on the primary signal and at least one second signal based on the secondary signal and generating a correlation signal on basis of the least one first signal and the at least one second signal.

21. The signal transceiver according to claim 20, wherein the receiver comprises a doppler processor for receiving the correlation signal and through processing of the same generating velocity information related to the at least one reflecting object.

22. The signal transceiver according to claim 21, wherein the receiver comprises at least one demodulator for receiving the primary signal and the secondary signal and based thereon generating at least one primary demodulated signal component respective at least one secondary demodulated signal component.

23. The signal transceiver according to claim 22, wherein the receiver comprises at least one digitizing unit for receiving the at least one primary demodulated signal component and the at least one secondary demodulated signal component and based thereon generating at least one primary digital signal component respective at least one secondary digital signal component.

24. The signal transceiver according to claim 23, wherein the correlator is adapted to generate the correlation signal by correlating the at least one primary digital signal component with the at least one secondary digital signal component.

25. The signal transceiver according to claim 19, wherein the transmitted probing signal comprises non-periodic Gaussian noise.

26. The signal transceiver according to claim 19, wherein the transmitted probing signal comprises a pseudo noise signal.

27. The signal transceiver according to claim 19, wherein the transmitted probing signal comprises a sine wave signal which is phase/frequency modulated with a noise signal.

28. The signal transceiver according to claim 19, wherein the transmitted probing signal comprises a sine wave signal which is phase/frequency modulated with a pseudo noise signal.

29. The signal transceiver according to claim 20, wherein the doppler processor is adapted to perform fast Fourier transforming.

30. The signal transceiver according to claim 20, wherein the doppler processor is adapted to perform binary Hadamard transforming.

31. The signal transceiver according to claim 19, wherein it is included into a target seeker system.

32. The signal transceiver according to claim 19, wherein the probing signal comprises a sonar signal.

33. The signal transceiver according to claim 19, wherein the probing signal comprises a radar signal.

34. The signal transceiver according to claim 33, wherein it is included into a reconnaissance radar system.

35. The signal transceiver according to claim 33, wherein it is included into a fire-control radar system.

36. The signal transceiver according to claim 23, wherein the at least one digitizing unit has a low resolution in relation to the amplitude information in the primary signal respective the secondary signal.

37. The signal transceiver according to claim 36, wherein the at least one digitizing unit comprises at least one binary A/D-converter.

* * * * *